(12) United States Patent
Lin et al.

(10) Patent No.: US 8,818,918 B2
(45) Date of Patent: Aug. 26, 2014

(54) DETERMINING THE IMPORTANCE OF DATA ITEMS AND THEIR CHARACTERISTICS USING CENTRALITY MEASURES

(75) Inventors: Ching-Yung Lin, Hawthorne, NY (US); Hanghang Tong, Hawthorne, NY (US); Jimeng Sun, Hawthorne, NY (US); Spyridon Papadimitriou, White Plains, NY (US); U Kang, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 13/096,220

(22) Filed: Apr. 28, 2011

(65) Prior Publication Data
US 2012/0278261 A1 Nov. 1, 2012

(51) Int. Cl.
*G06F 17/30* (2006.01)
*G06F 15/18* (2006.01)

(52) U.S. Cl.
USPC ....... 706/12; 707/748; 707/690; 707/E17.033

(58) Field of Classification Search
None
See application file for complete search history.

(56) References Cited

PUBLICATIONS

Estrade, Higham, "Network Properties Revealed through Matrix Functions", SIAM Review vol. 52, No. 4, 2010, pp. 696-714.*
White, Smyth, "Algorithms for Estimating Relative Importance in Networks", Proceeding KDD '03 Proceedings of the ninth ACM SIGKDD international conference on Knowledge discovery and data mining, 2003, pp. 266-275.*
Boldi, Rosa, Vigna, "HyperANF: Approximating the Neighbourhood Function of Very Large Graphs on a Budget", WWW 2011, Proceedings of 20th International World Wide Web Conference, Hyderbad, India, Apr. 1, 2011, pp. 625-624.*
Ng, Zheng, Jordan, "Link Analysis, Eigenvectors and Stability", Proceeding IJCAI'01 Proceedings of the 17th international joint conference on Artificial intelligence—vol. 2. 2001, pp. 903-910.*
Gleich, "Models and Algorithms for Pagerank Sensitivity", Phd Thesis at Stanford University, Palo Alto, CA, 2009, pp. 1-176.*
Gallagher and Eliassei-Rad, "Leveraging Label-Independent Features for Classificaiton in Sparsely Label Networks: An Empirical Study", Proceeding SNAKDD'08 Proceedings of the Second international conference on Advances in social network mining and analysis, 2008, pp. 1-19.*
Delvenne, Libert, "Centrality Measures and Thermodynamic Formalism for Complex Networks", Physical Review E, vol. 83, issude 4, Apr. 2011, pp. 046117-1-046117-7.*
N. Alon et al., "The space complexity of approximating the frequency moments," Tln Proc. of the 1996 Annual ACM Symp. on Theory of Computing, pp. 20-29, 1996.

(Continued)

*Primary Examiner* — Kakali Chaki
*Assistant Examiner* — Walter Hanchak
(74) *Attorney, Agent, or Firm* — William J. Stock

(57) ABSTRACT

Computer-implemented methods, systems, and articles of manufacture for determining the importance of a data item. A method includes: (a) receiving a node graph; (b) approximating a number of neighbor nodes of a node; and (c) calculating a average shortest path length of the node to the remaining nodes using the approximation step, where this calculation demonstrates the importance of a data item represented by the node. Another method includes: (a) receiving a node graph; (b) building a decomposed line graph of the node graph; (c) calculating stationary probabilities of incident edges of a node graph node in the decomposed line graph, and (d) calculating a summation of the stationary probabilities of the incident edges associated with the node, where the summation demonstrates the importance of a data item represented by the node. Both methods have at least one step carried out using a computer device.

21 Claims, 21 Drawing Sheets

(56) References Cited

PUBLICATIONS

K. Beyer et al.. "On synopses for distinct-value estimation under multiset operations." SIGMOD: pp. 199-210, 2007.

P. Bonacich, "Power and centrality: a family of measures," American Journal of Sociology, vol. 92, pp. 1170-1182, 1987.

S. P. Borgatti et al., "A graph-theoretic perspective on centrality," vol. 28(4), pp. 466-484, Social Networks, 2008.

U. Brandes, "A faster algorithm for betweeness centrality," Journal of Mathematical Sociology, vol. 25, pp. 163-177, 2001.

S. Brin et al., "The anatomy of a large-scale hypertextual (web) search engine," In Proceedings of the 7th International World Wide Web Conference, Brisbane, Australia, 1998; Computer Networks and ISDN Systems, vol. 30, pp. 107-117.

R. Chaiken et al., "Scope: easy and efficient parallel processing of massive data sets," Proc. VLDB Endow., vol. 1(2), pp. 1265-1276, 2008.

M. Charikar et al., "Towards estimation error guarantees for distinct values," In Proc. of the 2000 ACM Symp. on Principles of Database Systems, pp. 268-279, 2000.

J. Dean et al., "Mapreduce: Simplified data processing on large clusters," In OSDI'04: In Proc. of the 2000 ACM Symp. on Principles of Database Systems(Berkeley, CA, USA, 2004), USENIX Association. pp. 10-10.

P. Flajolet and G. N. Martin, "Probabilistic counting algorithms for data base applications," Probabilistic counting algorithms, J. of Comp. and Sys. Sci, 31:182-209, 1985.

Freeman, L.C., "Centrality in networks: I. conceptual clarification," Social Networks, vol. 1, pp. 215-239, 1979.

M. N. Garofalakis et al., "Approximate query processing: Taming the terabytes," VLDB, pp. 169-212, 27th International Conference on Very Large Databases, 2001.

R. L. Grossman et al., "Data mining using high performance data clouds: experimental studies using sector and sphere," SIGKDD, pp. 920-927, 2008.

C. Hubbell, "An input output approach to clique identification." Sociometry, vol. 28, pp. 377-399, 1965.

H. Jeong et al., "Lethality end centrality in protein network." Nature, vol. 411, pp. 41-42, 2001.

U. Kang et al., "Radius plots for mining terabyte scale graphs: Algorithms, patterns, and observations," SIAM International Conference on Data Mining, pp. 558-558, 2010.

U. Kang et al., "A peta-scale graph mining system—implementation and observations," IEEE International Conference on Data Mining, pp. 229-238, 2009.

L. Katz, "A new index derived, from sociometric data analysis," Psychometrika, vol. 18, pp. 39-43, 1953.

V. Krebs. "Mapping networks of terrorist cells," Connections, vol. 24(3), pp. 43-52, 2002.

R. L'ammel, "Google's mapreduce programming model—revisited," Science of Computer Programming, vol. 70, pp. 1-30, 2008.

Kranjec, "Computational Social Science," Univerza v. Ljubjani Fakulteta za matematiko in fiziko (disseration presentation), pp. 1-17, 2010.

J. Leskovec et al., "Realistic, Mathematically Tractable Generation and Evolution, Using Kronecker Multiplication." pp. 133-145, In PKDD, 2005.

Newman, "A measure of betweenness centrality based on random walks," Social Networks vol. 27, No. 1, 29-54, 2005.

Olsten et al., Pig latin: a not-so-foreign language for data processing, In SIGMOD '08, pp. 1099-1110, 2008.

S. Papadimitriou et a., "Disco: Distributed coclusteringwith mapreduce," ICDM 2008, Pisa, Italy, Dec. 15-19, pp. 512-521, 2008.

Pike et al., "Interpreting the data: Parallel analysis with sawzall," Scientific Programming Journal, vol. 13(4), pp. 277-298, 2005.

Yen et al., "Clustering using a randomwalk based distance measure," in Proceedings of the 13th Symposium on Artificial Neural Networks, pp. 317-324, 2005.

Sinha et al., "Unsupervised Graph-based Word Sense Disambiguation Using Measures of Word Semantic Similarity," In ICSC '07: Proceedings of the International Conference on Semantic Computing, pp. 363-369, Washington, DC, USA, 2007. IEEE Computer Society.

Borgatti, "Centrality and network flow," Social Networks, vol. 27, pp. 55-71, 2005.

Lazer et al., "Compulational Science," Science, vol. 323 No. 5915, pp. 721-723, Feb. 2009.

\* cited by examiner

```
Algorithm 1 Effective Closeness
Input:  Edge E = {(i, j)} of a graph G with |V| = n
Output: Effective Closeness C^ECL = {(score_v)}
 1: for v = 1 to n do
 2:     b(0, v) ← InitialBitstring;
 3:     C^ECL(v) = 0;
 4: end for
 5: sum_next ← 0;
 6: for r = 1 to MaxIter do
 7:     sum_cur ← sum_next;
 8:     sum_next ← 0;
 9:     // Update effective closeness of nodes
10:     for v = 1 to n do
11:         N̂(r − 1, v) ← DecodeBitstring(b(r − 1, v));
12:         b(r, v) =
            b(r−1, v) BITWISE-OR {b(r−1, u)|(v, u) ∈ E};
13:         N̂(r, v) ← DecodeBitstring(b(r, v));
14:         C^ECL(v) =
            C^ECL(v) + r × (N̂(r, v) − N̂(r − 1, v));
15:         sum_next = sum_next + C^ECL(v);
16:     end for
17:     // Check whether the effective closeness converged
18:     if sum_next = sum_cur then
19:         break for loop;
20:     end if
21: end for
22: C^ECL(v) = C^ECL(v)/n;
```

Fig. 4

Algorithm 2 LINERANK
Input: Edge $E = \{(i, j, weight)\}$ with $|E| = m$,
   Damping Factor $c = 0.85$
Output: LINERANK vector $linerank$
1: Build incidence matrices $S(G)$ and $T(G)$ from $E$
2: // Compute normalization factors
3: $\mathbf{d_1} \leftarrow S(G)^T \mathbf{1}$;
4: $\mathbf{d_2} \leftarrow T(G)\mathbf{d_1}$;
5: $\mathbf{d} \leftarrow 1./\mathbf{d_2}$;
6: // Run iterative random walks on $T(G)S(G)^T$
7: $\mathbf{v} \leftarrow$ random initial vector of size $m$;
8: $\mathbf{r} \leftarrow \frac{1}{m}\mathbf{1}$; // restart prob.
9: while $v$ does not converge do
10:   $\mathbf{v_1} \leftarrow \mathbf{dv}$; // Hadamard product
11:   $\mathbf{v_2} \leftarrow S(G)^T \mathbf{v_1}$;
12:   $\mathbf{v_3} \leftarrow T(G)\mathbf{v_2}$;
13:   $\mathbf{v} \leftarrow c\mathbf{v_3} + (1-c)\mathbf{r}$; // add with the restart probability
14: end while
15: $linerank \leftarrow (S(G) + T(G))^T \mathbf{v}$;

Fig. 7

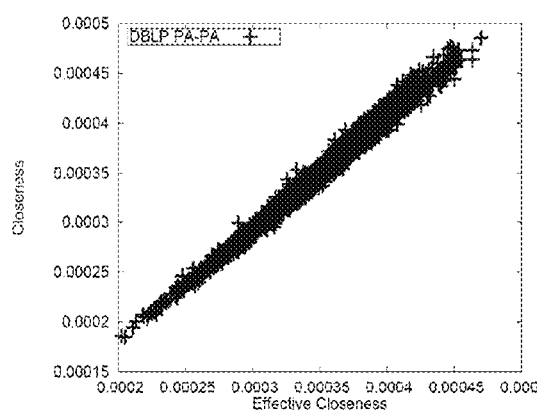
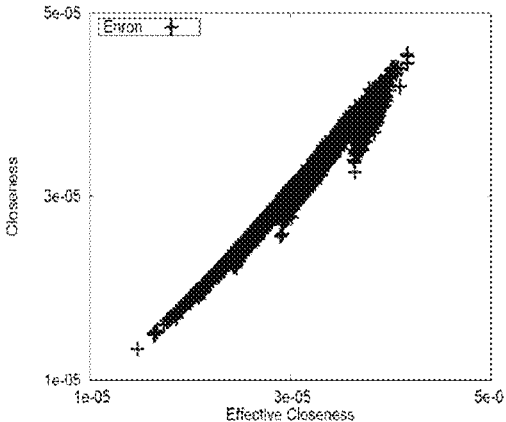
Figure 11(a)          Figure 11(b)
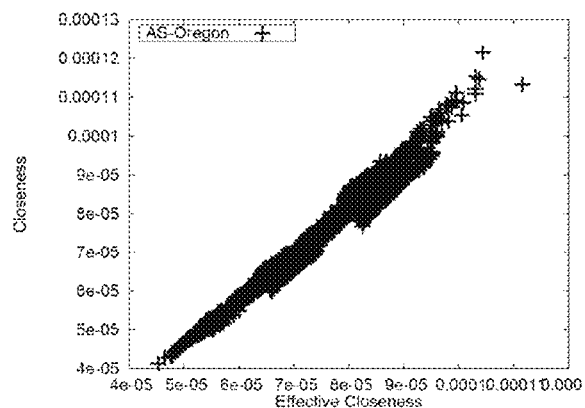
Figure 11(c)

DETERMINING THE IMPORTANCE OF DATA ITEMS AND THEIR CHARACTERISTICS USING CENTRALITY MEASURES

BACKGROUND OF THE INVENTION

Centrality is widely-used for measuring the relative importance of nodes within a graph. For example, who are the most well-connected people in a social network? Or who are critical for facilitating the transmission of information in a terrorist network? Which proteins are the most important for the lethality of a cell in protein interactions in a biological network? In general, the concept of centrality has played an important role in the understanding of various kinds of networks by researchers from computer science, network science, sociology, and recently emerging 'computational social science.'

Traditionally, centrality has typically been studied for networks of relatively small size. However, in the past few years, the proliferation of digital collection of data has led to the collection of very large graphs, such as the web, online social networks, user preferences, online communications, and so on. Many of these networks reach billions of nodes and edges, requiring terabytes of storage.

Centrality in very large graphs poses two key challenges.

First, some definitions of centrality have inherently high computational complexity. For example, shortest-path or random walk betweenness has complexity of at least $O(n^3)$, where n is the number of nodes in a graph. Furthermore, some of the faster estimation algorithms require operations that are not amenable to parallelization, such as all sources breadth-first search. Finally, it may not be straightforward or even possible to develop accurate approximation schemes. In summary, centrality measures should ideally be designed with scalability in mind from the outset. Traditionally, this has not always been the case. However, with the recent availability of very large networks, there is a clear need for scalable measures.

Second, even if a centrality measure is designed in a way that avoids expensive or non-parallelizable operations, developing algorithms that are efficient, scalable, and accurate is necessary and not straightforward.

Clever solutions are required to satisfy these problems.

SUMMARY OF THE INVENTION

According to an aspect of the present invention, a computer implemented method is provided for determining the importance of a data item in an electronic network. The method includes the steps of: (a) receiving a node graph, where the node graph is a representation of at least two data items with at least one relationship between the at least two data items, where the at least two data items are represented by nodes on the node graph, and where the at least one relationship is represented by at least one edge between the nodes; (b) approximating a number of neighbor nodes of at least one node of the node graph; and (c) calculating a average shortest path length from the at least one node to remaining nodes contained in the node graph using the approximated number of neighbor nodes, where the calculated average shortest path demonstrates the importance of a data item represented by the at least one node, (d) where at least one step is carried out using a computer device.

According to another aspect of the present invention, a computer implemented method is provided for determining the importance of a data item in an electronic network. The method includes the steps of: (a) receiving a node graph, where the node graph is a representation of at least two data items with at least one relationship between the at least two data items, where the at least two data items are represented by nodes on the node graph, and where the at least one relationship is represented by at least one edge between the nodes; (b) building an approximation of a line graph of the node graph by decomposing the line graph into sparse matrixes; (c) calculating stationary probabilities of edges in the decomposed line graph using the sparse matrixes, where the edges are incident edges associated with at least one node of the node graph; and (d) calculating a summation of the stationary probabilities of the incident edges associated with the at least one node of the node graph, where the summation demonstrates the importance of a data item represented by the at least one node, (e) where at least one step is carried out using a computer device.

According to yet another aspect of the present invention, a computer implemented data assessment system is provided for determining the importance of a data item. The system includes: (a) an input receiving unit configured to receive a node graph, where the node graph is a representation of at least two data items with at least one relationship between the at least two data items, where the at least two data items are represented by nodes on the node graph, where the at least one relationship is represented by at least one edge between the nodes; (b) an approximating unit configured to approximate a number of neighbor nodes of at least one node of the node graph; and (c) a calculating unit configured to calculate a average shortest path length from the at least one node to remaining nodes contained in the node graph using the approximated number of neighbor nodes, where the calculated average shortest path demonstrates the importance of a data item represented by the at least one node.

According to yet another aspect of the present invention, a computer implemented data assessment system is provided for determining the importance of a data item. The system includes: (a) an input receiving unit configured to receive a node graph, where the node graph is a representation of at least two data items with at least one relationship between the at least two data items, where the at least two data items are represented by nodes on the node graph, where the at least one relationship is represented by at least one edge between the nodes; (b) a building unit configured to build an approximation of a line graph of the node graph by decomposing the line graph into sparse matrixes; (c) a calculating stationary probability unit configured to compute stationary probabilities of edges in the decomposed line graph using the sparse matrices, where the edges are incident edges associated with at least one node of the node graph; and (d) a calculating a summation unit configured to compute a summation of the stationary probabilities of the incident edges associated with the at least one node of the node graph, where the summation demonstrates the importance of a data item represented by the at least one node.

BRIEF DESCRIPTION OF THE DRAWINGS

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The following figures are included:

FIG. 2 (b) is a directed line graph of the simple weighted node graph in FIG. 2 (a).

FIG. 4 is an algorithm implemented according to a computer implemented method for determining the importance of a data item according to an embodiment of the present invention.

FIG. 7 is an algorithm implemented according to a computer implemented method for determining the importance of a data item according to an embodiment of the present invention.

FIG. 10 (b) demonstrates an embodiment of the present invention that enables identification, visualization, comparison and classification according to an embodiment of the present invention, and displays results revealing the utility and application of an embodiment of the present invention.

FIG. 10 (c) demonstrates an embodiment of the present invention that enables identification, visualization, comparison and classification according to an embodiment of the present invention, and displays results revealing the utility and application of an embodiment of the present invention.

FIG. 10 (d) provides a point of comparison for embodiments of the present invention by providing experimental results for the betweenness centrality.

FIG. 10 (e) demonstrates an embodiment of the present invention that enables identification, visualization, comparison and classification according to an embodiment of the present invention, and displays results revealing the utility and application of an embodiment of the present invention.

FIG. 10 (f) demonstrates an embodiment of the present invention that enables identification, visualization, comparison and classification according to an embodiment of the present invention, and displays results revealing the utility and application of an embodiment of the present invention.

FIG. 11(a) demonstrates an embodiment of the present invention that enables identification, visualization, comparison and classification according to an embodiment of the present invention, and displays results revealing the utility and application of an embodiment of the present invention.

FIG. 11(b) demonstrates an embodiment of the present invention that enables identification, visualization, comparison and classification according to an embodiment of the present invention, and displays results revealing the utility and application of an embodiment of the present invention.

FIG. 11(c) demonstrates an embodiment of the present invention that enables identification, visualization, comparison and classification according to an embodiment of the present invention, and displays results revealing the utility and application of an embodiment of the present invention.

DETAILED DESCRIPTION OF THE PREFERRED EMBODIMENTS

Figure 1A:
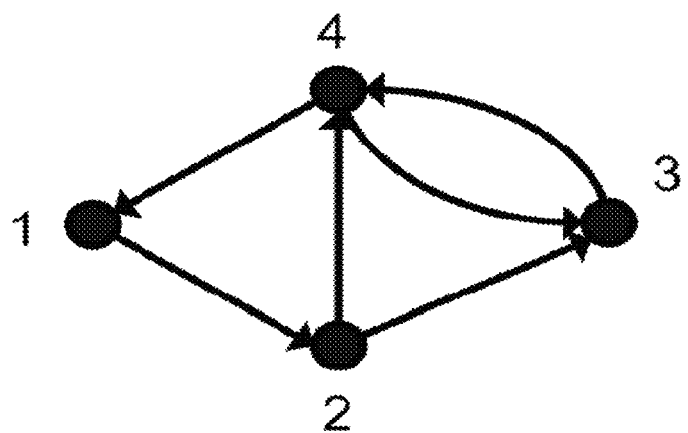
FIG. 1(a) is a depiction of a simple node graph.

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

The table supplied below is provided to assist in comprehending the content of this application and the present invention:

TABLE 1

Table of symbols

| Symbol Definition | Definition |
|---|---|
| n | number of nodes in a graph |
| m | number of edges in a graph |
| A | adjacency matrix of a graph |
| indeg(v) | in-degree of node v |
| outdeg(v) | out-degree of node v |
| N(r; v) | number of neighbors of node v within r steps |
| G | original graph |
| L(G) | line graph of the original graph G |
| S(G) | source incidence matrix of the graph G |
| T(G) | target incidence matrix of the graph G |

Centrality has attracted a lot of attention as a tool for studying various kinds of networks including social, information, and biological networks. The centrality of a node in a network is interpreted as the importance of the node. This is significant because a node graph can operate as a representation of the relationship in networks, where a node can operate as a representation of a data item in that network, such as a social network, research data, electronic network, a databank, etc., and edges between the node in the node graph can represent a relationship between the nodes in the node graph. Therefore, knowing the importance of a node can reveal the importance of the data item associated with that node.

One group of centrality measures is the degree related measures. The degree centrality, the simplest yet the most popular centrality measure, belongs to this group. The degree centrality $C_i^{DEG}$ of node i is defined to be the degree of the node. A way of interpreting the degree centrality is that it counts the number of paths of length 1 that emanate from a node. A generalization of the degree centrality is the K-path centrality which is the number of paths less than or equal to k that emanate from a node. Several variations of the K-path centrality exist based on the type of path: geodesic, edge-disjoint, vertex-disjoint K-path are among them.

Another line of centralities are based on the 'walk' on the graph. The Katz centrality counts the number of walks starting from a node, giving penalties to longer walks. In a mathematical form, the Katz centrality $C_i^{KATZ}$ of node i is defined by $$c_i^{KATZ} = e_i^T \left( \sum_{j=1}^{\infty} (\beta A)^j \right) 1$$

where $e_i$ is a column vector whose $i^{th}$ element is 1, and all other elements are 0. The $\beta$ is a positive penalty constant to control the weight on the walks of different length. A slight variation of the Katz measure is the Bonacich centrality which allows for a negative $\beta$. The Bonacich centrality $c_i^{BON}$ of node i is defined to be $$c_i^{BON} = e_i^T \left( \frac{1}{\beta} \sum_{j=1}^{\infty} (\beta A)^j \right) 1$$

where the negative weight allows to subtract the even-numbered walks from the odd-numbered walks which have an interpretation in exchange networks. The Katz and the Bonacich centralities are special cases of the Hubbell centrality. The Hubbell centrality $c_i^{HUB}$ of node i is defined to be $$c_i^{HUB} = e_i^T \left( \sum_{j=1}^{\infty} X^j \right) y$$

where X is a matrix and y is a vector. It can be shown that X=$\beta$A and y=$\beta$A1. A1 lead to the Katz centrality, and X=$\beta$A and y=A1 lead to the Bonacich centrality.

Except for degree centrality, which often suffers a lack of cost-efficiency, a lack of speed-efficiency, a lack of accuracy in larger networks, and the limitation of merely capturing the local information of a node, most of these variations will require some parameter that is difficult to determine for real networks.

Another group of centrality measures is the diameter related measures, which count the length of the walks. The most popular centrality measure in this group is the Freeman's closeness centrality. It measures the centrality by computing the average of the shortest distances to all other nodes. Let S be the matrix whose (i, j)th element contains the length of the shortest path from node i to j. Then, the closeness centrality $c_i^{CLO}$ of node i is defined to be $c_i^{CLO} = e_i^T S 1$.

Traditional diameter-based measures are effective in differentiating low degree nodes. However, the existing diameter based measure has several draw-backs, including the fact that it does not scale up and, as a result, for billion-scale graphs, it is prohibitively expensive. An aspect of the present invention is to provide a superior method, as discussed below, which remedies this and other defects.

The last group of the centrality measures is the flow related measures. It is called 'flow related' since the information flowing through edges are considered. The most well-known centrality in this group is the Freeman's betweenness centrality. It measures how much a given node lies in the shortest paths of other nodes. Let $b_{jk}$ be the number of shortest paths from node j to k, and $b_{jik}$ be the number of shortest paths from node j to k that passes through node i. The betweenness centrality $c_i^{BET}$ of node i is defined to be $$c_i^{BET} = \sum_{j,k} \frac{b_{jik}}{b_{jk}}.$$

The naïve algorithm for computing the betweenness involves all-pair shortest paths which require $\Theta(n^3)$ time and $\Theta(n^2)$ storage. U. Brandes, "A faster algorithm for betweenness centrality," Journal of Mathematical Sociology, 2001, discloses a faster algorithm by running n single-source-shortest-path algorithms which require O(n+m) space and run in O(nm) and O(nm+n2 log n) time on un-weighted and weighted networks, respectively, where n is the number of nodes and m is the number of edges in a graph. M. E. J. Newman, "A measure of betweenness centrality based on random walks," Social Networks, 2005, proposed an alternative betweenness centrality based on random walks on the graph. The main idea is that instead of considering shortest paths, it considers all possible walks and computes the betweenness from them. Specifically, let R be the matrix whose (j, k)th element $R_{jk}$ contains the probability of a random walk, starting from j with the absorbing node k, passing through the node i. Then, the Newman's betweenness centrality $c_i^{NBE}$i of node i is define to be $c_i^{NBE} = \sum_{j \neq i \neq k} R_{jk}$. Computing the Newman's betweenness centrality requires $O(mn^2)$ time which is prohibitively expensive.

In addition to other flaws and setbacks, none of the existing flow related measures are scalable to large networks, and an aspect of the present invention, as discussed below, seeks to remedy these problems by presenting a new method that remedies these issues.

One embodiment of the present invention is a method that employs a new centrality measure called Effective Closeness to determine the importance of a data item as described by FIG. 3, and in more detail below.

The effective closeness centrality $C^{ECL}(v)$ of a node v is defined as the approximate average distance from v to all other nodes, or put in another way, the approximate average shortest path length from v to all other nodes.

Let N(r, v) be the number of neighbors of node v within r steps, and $N_v(r)$ be the number of nodes whose shortest distances to v is r, where r can be a predefined value based an edge length or edge lengths in the node graph. Notice that $N_v(r) = N(r, v) - N(r-1, v)$. Based on these quantities, standard closeness can be defined by $$\frac{\sum_{r=1}^{d} r \cdot N_v(r)}{n} = \frac{\sum_{r=1}^{d} \Box r \cdot (N(r, v) - N(r-1, v))}{n}$$

where d is the diameter of the graph and n is the number of nodes. Let's assume that it is easy to obtain $\hat{N}(r,v)$, an unbiased estimate of $\hat{N}(r,v)$. Let's define $\hat{N}_v(r)$ to be $\hat{N}(r,v) - \hat{N}(r-1,v)$. By the linearity of expectation, $\hat{N}_v(r)$ gives an unbiased estimate of $N_v(r)$. Thus, by using this approximation, effective closeness $C^{ECL}(v)$ can be defined by $$C^{ECL}(v) = \frac{\sum_{r=1}^{d} r \cdot \hat{N}(r)}{n} = \frac{\sum_{r=1}^{d} r \cdot (\hat{N}(r, v) - \hat{N}(r-1, v))}{n}.$$

Estimation techniques that can facilitate the approximation of $\hat{N}(r,v)$ exist, such as those found in K. Beyer et al., "On synopses for distinct-value estimation under multiset operations," SIGMOD, 2007; M. Charikar et al., "Towards estimation error guarantees for distinct values," PODS, 2000; Garofalakis et al., "Approximate query processing: Taming the terabytes," VLDB, 2001. Additionally, another technique that can facilitate the approximation is the Flajolet-Martin algorithm found in P. Flajolet and G. N. Martin, "Probabilistic counting algorithms for data base applications," Journal of Computer and System Sciences, 1985. These techniques are exemplary and in no way limiting, as other techniques exist to facilitate the approximation.

Determining the effective closeness of a node reveals its importance, among other reasons, because it demonstrates its proximity to other nodes in the node graph based on the edge connections in the graph. This in turn reveals the importance of a data item associated with that node because the node represents the data item, and the edges, which connect the nodes, represent the relationship between the data items.

Figure 3:
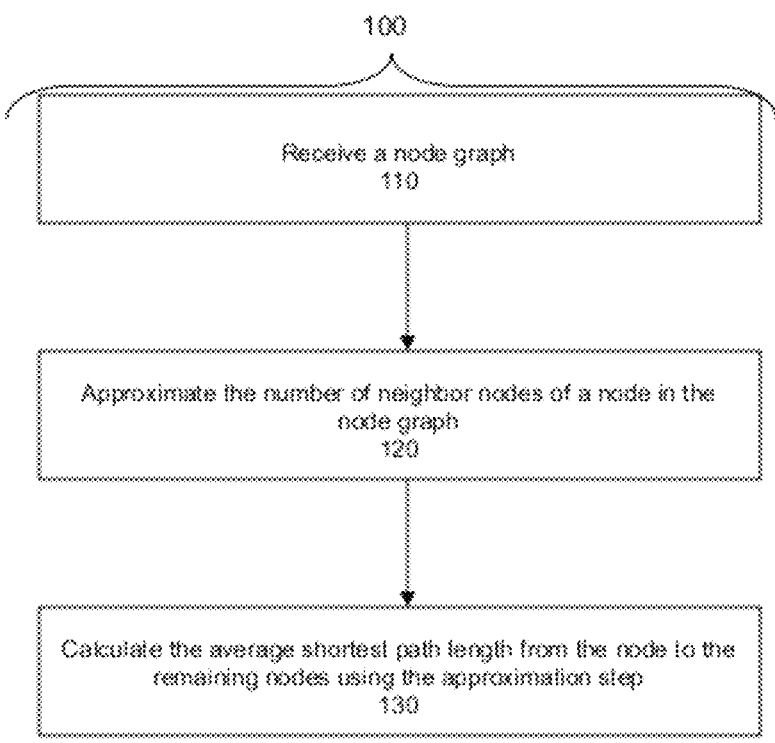
FIG. 3 is a block diagram that illustrates a computer implemented method for determining the importance of a data item according to an embodiment of the present invention.

Referring now to FIG. 3 a flow chart is illustrated for one embodiment of the present invention, a computer implemented method 100 for determining the importance of a data item in an electronic network.

The first step 110 involves receiving a node graph that is a representation of a network, where the nodes are the data items of the network, and the edges of the node graph connecting the nodes represent the relationship or relationships between the data items. FIG. 1(a) illustrates a simple node graph for exemplary purposes.

The second step 120 of the method involves approximating the number of neighbor nodes of a node in the node graph.

The third step 130 involves calculating the average shortest path length from the one node to the remaining nodes contained in the node graph using the approximated number of neighbor nodes. This calculation demonstrates the importance of the data item represented by the node by assessing the node's proximity to all other nodes in the node graph. Since an approximation is used, efficiency in cost is achieved; and since the number of nodes in the graph remains a consideration, accuracy is not sacrificed.

At least one step of the method 100 is performed on a computer device.

Another embodiment of the present invention permits the approximation step to be carried out using an estimation algorithm, such as those described above and still another embodiment permits the estimation to be carried out by the Flajolet-Martin algorithm. These techniques can perform the estimation by iteratively updating a sum representing a total number of neighbor nodes, where the iteration begins with a minimum defined unit, which can be a unit based on edge length, and ends when the iteration reaches a value equivalent to a diameter of said node graph.

Also, as should be apparent, the method 100 in FIG. 3, and any variation described herein, can be performed on one node, multiple nodes, and all nodes in a node graph.

To further demonstrate the utility and additional embodiments of the invention, and according to FIG. 4, an algorithm, Algorithm 1, has been developed, employing the effective closeness measure in HADOOP, and executed on a computer device.

MAPREDUCE is a parallel programming framework for processing web-scale data. MAPREDUCE has two advantages: (a) the data distribution, replication, fault-tolerance, and load balancing are handled automatically; and furthermore, (b) it uses the familiar concept of functional programming. The programmer needs to define only two functions, a map and a reduce. The general framework is as follows: (a) the map stage reads the input file and emits (key, value) pairs; (b) the shuffling stage sorts the output and distributes them to reducers; (c) the reduce stage processes the values with the same key and emits another (key, value) pairs which become the final result. HADOOP is the open source version of MAPREDUCE. HADOOP uses its own distributed file system HDFS, and provides a high-level language called PIG. Due to its excellent scalability, ease of use, cost advantage, HADOOP has been used for important graph mining algorithms, but additional programs exist for implementing the present invention, with other variants including SCOPE, Sphere, and Sawzall. As such, the use of HADOOP is merely exemplary and in no way limiting; those skilled in the art will find other platforms and techniques for executing the present invention.

The HADOOP Algorithm 1 in FIG. 4 reveals additional features and embodiments of the present invention. One feature is that it computes the effective closeness for every node in the graph; which means that the importance of every data item associated with a node in the node graph can be easily determined.

One additional embodiment of the present invention is that Algorithm 1 iteratively updates the Flajolet-Martin (FM) bitstrings for every node, as can be seen in Algorithm 1. One observation is that the bitstrings update operation can be represented in a form similar to matrix-vector multiplication. Specifically, let $b(r-1, v)$ be node v's bitstring encoding the set of nodes within distance $r-1$. Then the next-step bitstring $b(r, v)$ is computed by BITWISE-OR'ing the current bitstring $b(r-1,v)$ of v and the current bitstrings of the neighbors of v: $b(r,v)=b(r-1, v)$ BITWISE-OR $\{b(r-1, u)|(v, u) \in E\}$.

Since the equation is a generalized form of matrix-vector multiplication, another embodiment of the present invention, and according to Algorithm 1, is that repeated matrix-vector multiplication with BITWISE-OR customization computes the approximation $N^{\wedge}(r,v)$ and thus can compute the effective closeness using Equation $$C^{ECL}(v) = \frac{\sum_{r=1}^{d} r \cdot N_v^{\wedge}(r)}{n} = \frac{\sum_{r=1}^{d} r \cdot (N^{\wedge}(r, v) - N^{\wedge}(r-1, v))}{n}$$

as shown in the Algorithm 1. The InitialBitstring (line 2) and DecodeBitstring (line 11, 13) create and decode the FM bitstrings.

Still another embodiment of the present invention, as per Algorithm 1, is that the sumcur and sumnext variables are used to check whether r reached the maximum diameter of the graph, and to finish the computation early if possible.

Algorithm 1's implementation of effective closeness is much more efficient than the standard closeness technique, other diameter techniques, and other centrality techniques in general. This algorithm requires O(dm) time, where d is the diameter of the graph and m the number of edges, since it requires at most d matrix-vector multiplications. In contrast, the standard closeness measure requires $O(n^3)$ time, where n is the number of nodes, which is much longer than O(dm), given that real-world graphs have very small diameters.

The above algorithm, Algorithm 1, is exemplary, and those skilled in the art can see that the methods and features of the present invention can be implemented both in a different manner and on a different platform consistent with the principles described herein. Furthermore, the above methods and aspects of the present invention can be applied to more than one node in the node graph. In fact, as displayed in FIG. 4, and discussed above, Algorithm 1 performs the computation for every node in the applicable node graph; thus, it determines the importance of every data item represented by a node in an applicable node graph.

Figure 5:
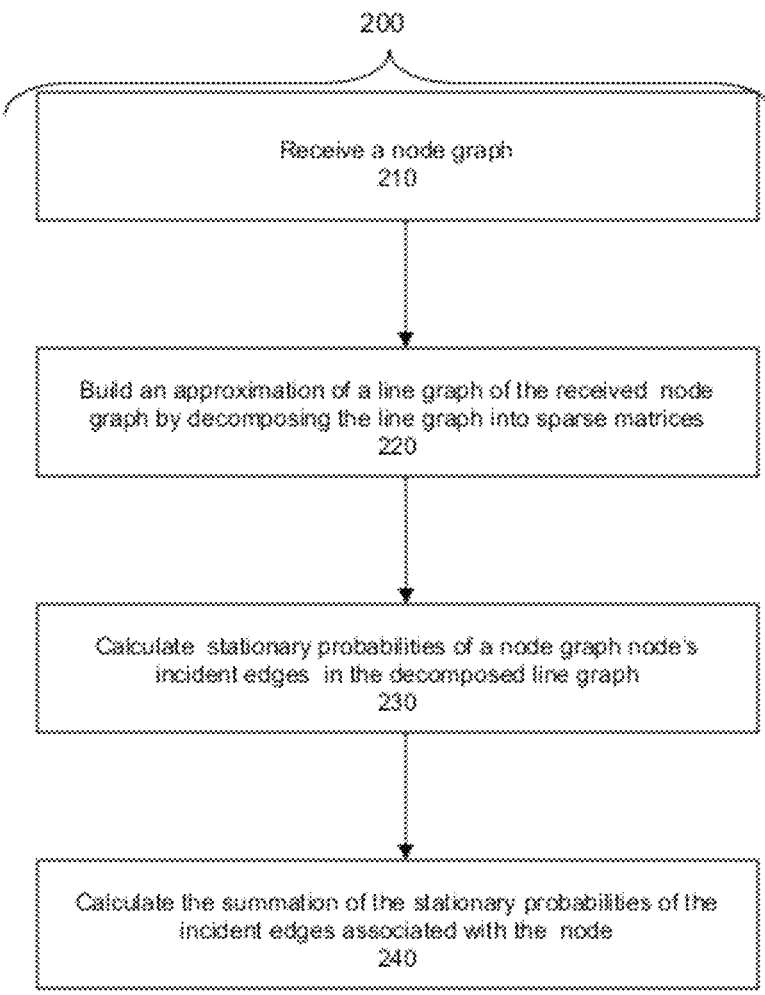
FIG. 5 is a block diagram that illustrates a computer implemented method for determining the importance of a data item according to an embodiment of the present invention.

Referring now to FIG. 5, another embodiment of the present invention is a method 200 that employs a new flow based centrality measured called LINERANK to determine the importance of a data item in an electronic network.

The first step 210 involves receiving a node graph that is a representation of a network, where the nodes are the data items of the network, and the edges of the node graph connecting the nodes represent the relationship or relationships between the data items.

The second step 220 involves building an approximation of the line graph of the received node graph by decomposing the line graph into sparse matrices.

The third step 230 involves calculating the stationary probabilities of a node graph's node's incident edges in the line graph.

The fourth step 240 involves calculating the summation of the stationary probabilities of the node graph's node's incident edges in the line graph, where the value or score of the summation demonstrates the importance of the data items associated with that node.

At least one step of the method 200 is performed on a computer device.

Figure 6:
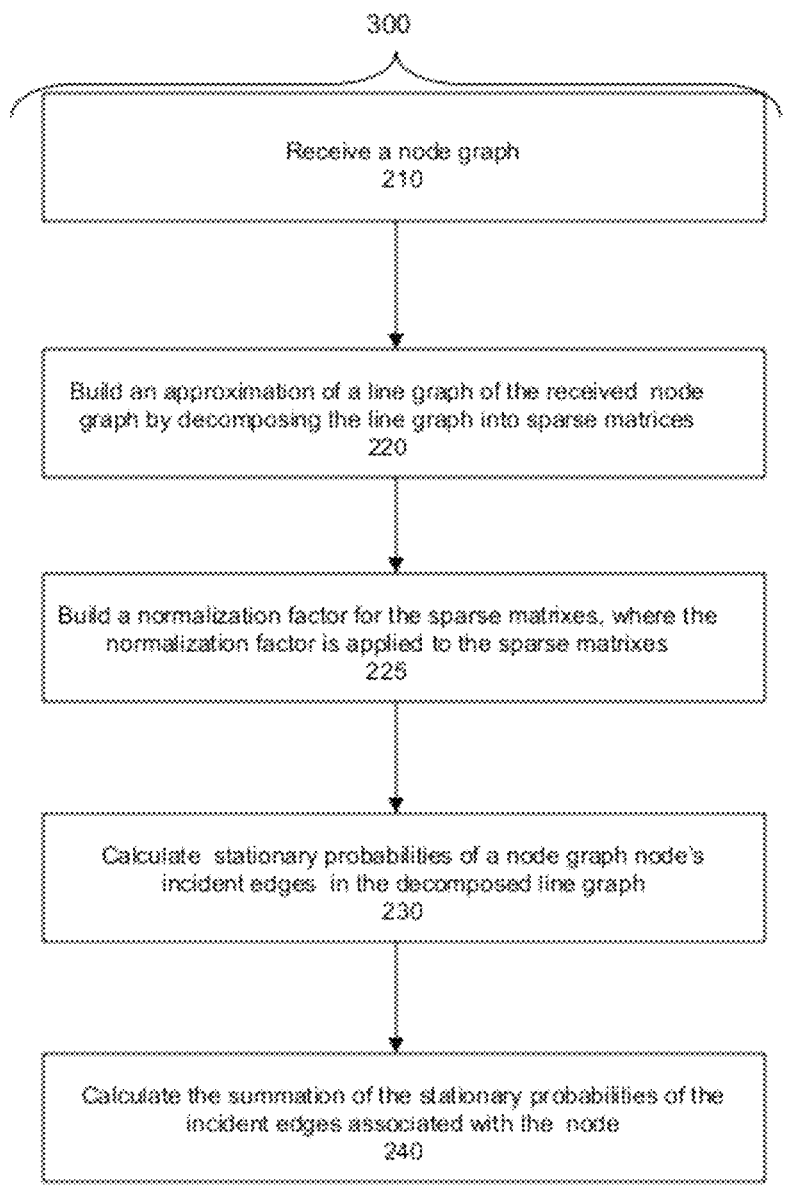
FIG. 6 is a block diagram that illustrates a computer implemented method for determining the importance of a data item according to an embodiment of the present invention.

Also, as should be apparent, the method 200 in FIG. 5, and any variation described herein, including the method 300 in FIG. 6, can be performed on one node, multiple nodes, and all nodes in a node graph.

Since existing flow based measures, and many centrality measures generally, do not scale well, an aspect of the present invention employs the new flow-based measure, LINERANK. LINERANK measures the importance of a node by aggregating importance score of its incident edges. This represents the amount of information that flows to the node. Edge importance is defined as the probability that a random walker, visiting edges via nodes with random restarts, will stay at the edge. To define this random walk precisely, a new graph is induced, called a directed line graph, from the original graph.

Figure 1B:
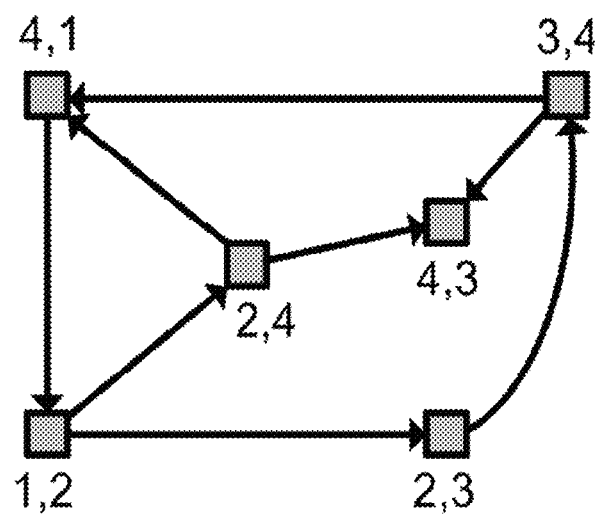
FIG. 1(b) is a directed line graph of the simple node graph in FIG. 1(a).

A directed line graph is defined as follows: Given a directed graph G, its directed line graph L(G) is a graph such that each node of L(G) represents an edge of G, and there is an edge from a node e1 to e2 in L(G) if for the corresponding edges $(u_1, v_1)$ and $(u_2, v_2)$ in G, $v_1 = u_2$. FIG. 1(b) illustrates a directed line graph of a simple node graph illustrated by FIG. 1(a). FIGS. 1(a) and 1(b) can be summarized as follows: there is an edge from the node (4, 1) to (1, 2) in L(G) since the edge (4, 1) follows (1, 2) in G. Contemplating, a random walker visiting nodes on the line graph, the walker staying at a node at the current step will move to a neighboring node with high probability c, or to a random node with low probability 1−c, so that the walk mixes well. Seeking the stationary probability of this random walk requires realizing that the stationary probabilities are associated with edges of the original graph.

Thus, the LINERANK score of a node v is calculated or computed by aggregating the stationary probabilities of its incident edges on the line graph L(G); or put another way, the LINERANK value is the summation of the stationary probabilities of the incident edges associated with the node v in the line graph.

Determining the LINERANK of a node reveals its importance, among other reasons, because it represents the amount of information flowing through the node; or put another way, it measures the probability that a random walk on the graph will involve going through the edges associated with that node. This in turn reveals the importance of a data item associated with that node because the node represents the data item, and the edges, which connect the nodes, represent the relationship between the data items. This is true even for graphs with weighted edges, as described below.

Figure 2A:
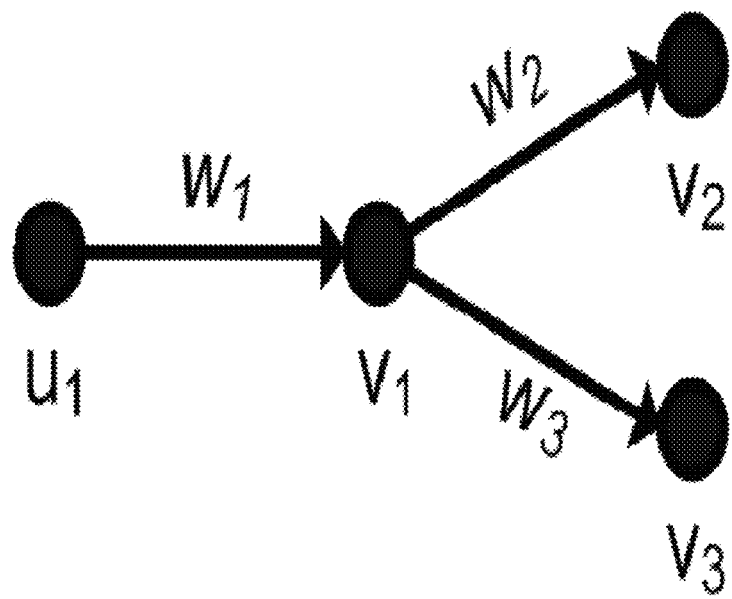
FIG. 2 (a) is a depiction of a simple weighted node graph.
Figure 2B:
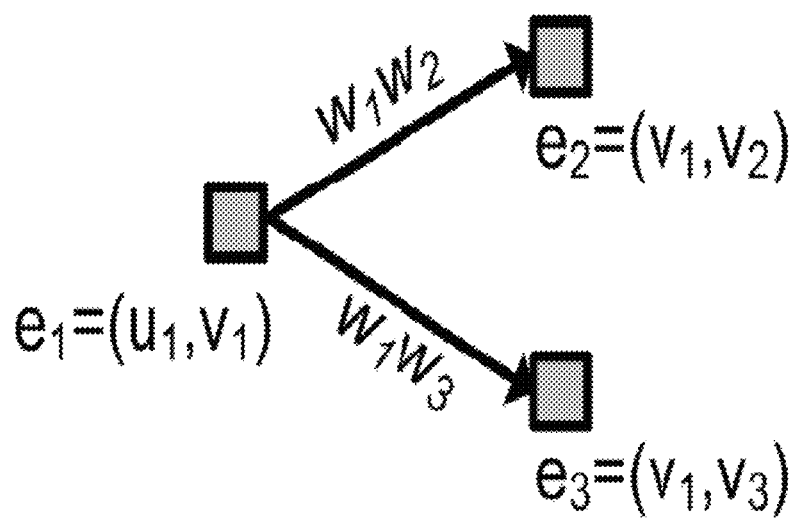

The random walk in the line graph is performed with transition probabilities proportional to edge weights. For an unweighted original graph, the line graph is also unweighted. However, for a weighted original graph the line graph is also weighted. For example, in FIG. 2 (a), the node e1 in L(G), which corresponds to the edge $(u_1, v_1)$ of G in FIG. 2 (b), transits either $e_2=(v_1, v_2)$ or $e_3=(v_1, v_3)$ with the probability proportional to $w_2$ and $w_3$, respectively.

According to another embodiment of the present invention, the weights of the adjacent edges in the original graph are multiplied to compute the edge weights in the line graph. That is, assume two adjacent edges $e_1 \equiv (u_1, v_1)$ and $e_2 \equiv (v_1, v_2)$ in G have weights $w_1$ and $w_2$, respectively. Then the edge $(e_1, e_2)$ in L(G) has the weight $w_1 w_2$ where $e_1$ and $e_2$ are the corresponding nodes in L(G) to $(u_1, v_1)$ and $(v_1, v_2)$. For example, in FIGS. 2 (a) and 2(b), where FIG. 2 (a) is the Original graph G, and FIG. 2 (b) is the directed line graph the following is shown: weights of the original graph G and the corresponding directed line graph L(G). The rectangular nodes in (b) corresponds to edges in (a). If two consecutive edges $(u_1, v_1)$ and $(v_1, v_2)$ in G have weights $w_1$ and $w_2$, respectively, then the corresponding induced edge in L(G) has the weight $w_1 w_2$. For example, the edge $(e_1, e_2)$ in L(G) has the weight $w_1 w_2$. Therefore, one can define a Weighted direct line graph as follows: if two consecutive edges $(u_1, v_1)$ and $(v_1, v_2)$ in G have weights $w_1$ and $w_2$, respectively, then the corresponding induced edge in L(G) has the weight $w_1 w_2$.

However, the line graph can grow to very large sizes, because a node v with in-degree $\alpha$ and out-degree $\beta$ in the original graph will generate a $\alpha\beta$ edges in the line graph. Thus, the number $|E_{L(G)}|$ of edges in the line graph is $$|E_{L(G)}| = \sum_{v=1}^{n} indeg(v) \cdot out\ deg(v).$$

Real-world graphs have nodes with very large in and out degrees, as the power-law degree distribution has long tails. Thus, even if the original graph is sparse, the line graph can be much denser than the original. For example, the line graph of the Yahoo-Web graph provided below in Table 2 has 251 billion edges, which is ~40× more edges than the original graph. Thus, explicit construction is possible, but not favorable, for large graphs.

An embodiment of the present invention makes computation of the LINERANK possible without explicitly constructing the line graph 220. It turns out that the weighted, directed line graph L(G), defined above, has a decomposition into sparse matrices and thus LINERANK can be computed efficiently on those sparse matrices rather than on the dense matrix L(G) 230. (It is also possible to have an unweighted line graph, since this is merely a simpler situation where the edge weight parameters will have a value of zero, or no value input at all).

One embodiment of the present invention defines the Sparse Matrixes as follows:
SOURCE INCIDENCE MATRIX: The source incidence matrix S(G) of a graph G with n nodes and m edges is an m×n matrix with entries $S(G)_{ij}=w_i$ if the $i^{th}$ edge with the weight wi in G has node j as its source, and $S(G)_{ij}=0$ otherwise.
TARGET INCIDENCE MATRIX: The target incidence matrix T(G) of a graph G with n nodes and m edges is an m×n matrix with entries $T(G)_{ij}=w_i$ if the $i^{th}$ edge with the weight $w_i$ in G has node j as its target, and $T(G)_{ij}=0$ otherwise.

Given the above, an embodiment of the present invention permits Line Graph Decomposition as follows: given a directed, weighted graph G with n nodes and m edges, its line graph L(G) has a decomposition with sparse matrices, where $L(G)=T(G)S(G)^T$ where T(G) and S(G) are the target and the source incident matrices, respectively.

Proof for the Decomposition according to this aspect is as follows: The $(i, j)^{th}$ element $L(G)_{ij}$ of L(G) is nonzero and have the value $w_i w_j$ if and only if there exists two consecutive edges $e_i=(u_i, v_i)$, and $e_j=(v_i, v_j)$ in G with weights $w_i$ and $w_j$, respectively. On the right side of the equation, (i, j)th element is computed by $t_i^T s_j$ where $t_i$ is the ith row of T, and $s_j$ is the jth row of S. By the definition of the incidence matrix, it follows that $t_i^T s_j = w_i w_1$.

According to FIG. 6, another embodiment of the invention is revealed 300, whereby a normalization step 225 occurs prior to the calculating steps. This normalization can be used to make the sparse matrixes suitable for power iteration, and it increases computational efficiency.

Accordingly, another embodiment of the present invention permits computing the stationary probability of a random walk on the line graph L(G) by the so called power method, or power iteration method, which repeatedly multiplies L(G) with a random initial vector. The decomposition permits multiplying L(G) with a vector v by first multiplying $S(G)^T$ with v, then multiplying T(G) with the previous result. After computing the stationary probability of the random walk on the line graph, the edge scores are aggregated or summed up for the node in question. This can be done by right multiplying the edge score by the overall incidence matrix B(G) of G, where B(G)=S(G)+T(G).

To further demonstrate the utility and additional embodiments of the present invention, and according to FIG. 7, an algorithm, Algorithm 2, has been developed, employing the LINERANK measure in HADOOP, and executed on a computer device.

Figure 8:
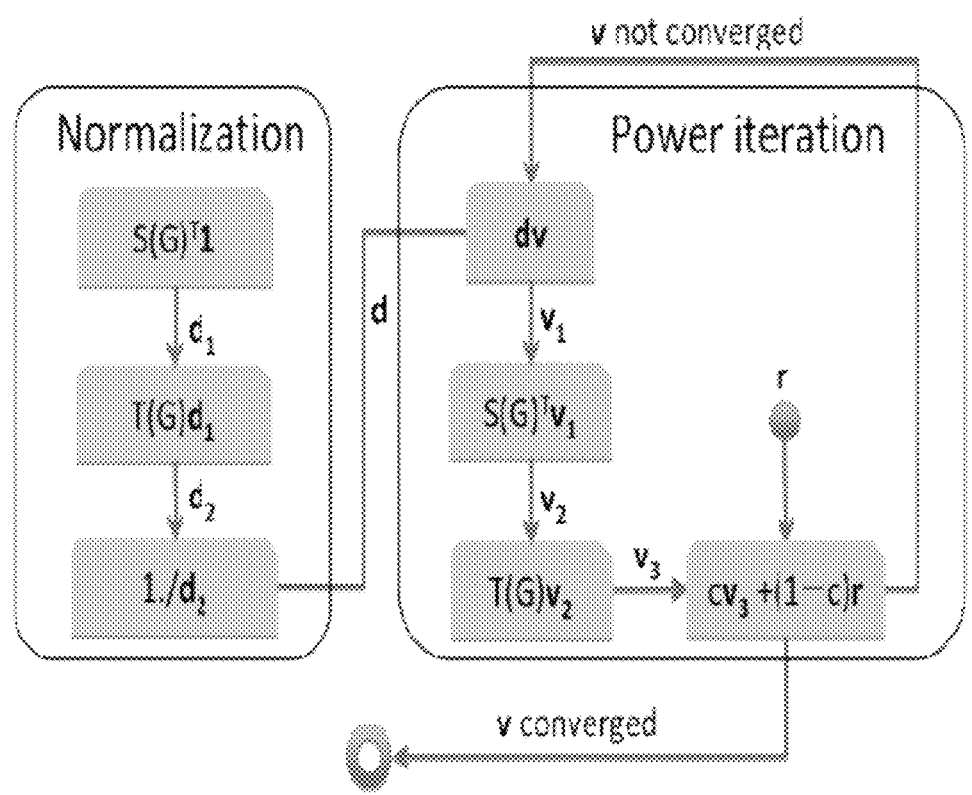
FIG. 8 is a block diagram that depicts an algorithm implemented according to a computer implemented method for determining the importance of a data item according to an embodiment of the present invention.

Algorithm 2 can be summarized in segments, and is visually displayed in FIG. 8, where the segments include: Normalization and Power Iteration.

The first part involves Building Incidence Matrices, lines 1-4 of Algorithm 2. First, the incident matrices S(G) and T(G) are constructed from the sparse adjacency matrix E. These matrices can be built in O(m) time by reading edges and emitting the corresponding outputs.

The next part of Algorithm 2 involves Computing Normalization Factors. The ith element of the diagonal matrix D contains the sum of ith column of L(G). D is used to column-normalize L(G) so that the resulting matrix can be used for the power iteration. The './' in line 5 represents the element-wise inverse operation.

The next part of Algorithm 2 involves performing a Random Walk on the line graph. From line 6 to 14, the random walk on the decomposed line graph is performed. All the operations are either matrix-vector multiplication, vector addition, or vector Hadamard products (line 10), all of which are not expensive. Also, the matrices S(G) and T(G) contain only m nonzero elements for each, which is typically much smaller than the L(G) if explicitly constructed. Those skilled in the art will appreciate that this reveals another embodiment of the present invention, which is that the Random Walk can be an indirect application of Page Rank on the line graph by applying Page Rank without explicitly constructing the line graph. In this particular embodiment, in Algorithm 2, the Page Rank is performed or computed by the Power Iteration method.

The final part involves computing the Final LINERANK Score. The edge scores are summed up in line 15 to get the final LINERANK score or value for each node. Note the most expensive operation in Algorithm 2 is matrix-vector multiplication which is performed efficiently in HADOOP.

Algorithm 2 takes O(km) time where k is the number of iterations and m is the number of edges in the original graph. This is easily established as follows: the time complexity is dominated by the while loop from line 9 to 14. Inside the while loop, the most expensive operations are the matrix-vector multiplications which take O(m) time since the number of nonzero elements in S(G) or T(G) is m.

The number of iterations k depends on the ratio of the absolute values of the top two largest eigenvalues of the line graph. An advantage of Algorithm 2 is that one can stop the computation after a few iterations to get reasonable accuracy, while the other betweenness centralities can not be stopped in an any-time fashion.

A similar result holds for space complexity. Algorithm 2 requires the same space as random walks on the original graph. Algorithm 2 requires O(m) space, and it can be established as follows: the space complexity is dominated by the incidence matrix B(G) which has 2m elements.

The above algorithm, Algorithm 2, is exemplary, and those skilled in the art can appreciate that the methods and aspects of the present invention can be implemented both in a different manner and on a different platform consistent with the principles described herein. Furthermore, the above methods and aspects of the present invention can be applied to more than one node in the node graph. In fact, as displayed in FIGS. 7 and 8, and discussed above, Algorithm 2 performs the computation for every node in the applicable node graph; thus, it determines the importance of every data item represented by a node in an applicable node graph.

According to another embodiment of the present invention, the LINERANK and effective closeness measures and Algorithms (Algorithm 1 and Algorithm 2) are applied to the datasets (both real and synthetic). With regards to results, experiments and implementations discussed in paragraphs [0073]-[0085], including descriptions and explanations concerning FIGS. 9(a)-11(c), effective closeness refers to a score relating to the use of the measure according to Algorithm 1 and LINERANK refers to a score relating to the use of the measure according to Algorithm 2 (as should be apparent from the Figures), unless otherwise expressly stated or implied. The datasets are summarized in the following table[1]:

[1]YahooWeb: released under NDA. Kronecker: http://www.cs.cmu.edu/_ukang/dataset Enron: http://www.cs.cmu.edu/_enron AS-Oregon: http://topology.eecs.umich.edu/data.html DBLP: http://www.cs.cmu.edu/_ukang/dataset

TABLE 2

Summary of datasets and main characteristics.

| Name | Nodes | Edges | Description |
|---|---|---|---|
| YahooWeb | 24M | 1B | WWW links between hosts |
| Kronecker | 177K | 1,977M | synthetic |
|  | 120K | 1,145M |  |
|  | 59K | 282M |  |
|  | 19K | 40M |  |
| Enron | 80K | 575M | Email |
| AS-Oregon | 13K | 74K | Router connections |
| DBLP Authors | 3K | 22K | DBLP prolific authors |

The graphs developed from the above data set are summarized in the table, as stated above, and are described herein. The YahooWeb graph contains the links between web hosts. The weight of an edge is the number of web pages between the hosts. The Enron data contains the email exchanges of Enron employees, where the weight is the number of emails between the two people. AS-Oregon contains the router connection information, and the DBLP Authors data contain the relationships of prolific authors who are defined to have published more than 50 papers. The weight of an edge is the number of papers co-authored by the incident authors. Note that the number of papers in the DBLP Authors dataset can be much smaller than the authors' total publication counts since it contains the induced sub-graph among the prolific authors.

The scalable algorithms were implemented in Java using Hadoop version 0.20.1. Large-scale experiments were run on the Yahoo! M45 cluster, using 10 to 70 machines. The standard measures of centrality used the iGraph package for R on a single machine. However, as those skilled in the art can appreciate, this is merely exemplary, and other implementation techniques exist.

Figure 9A:
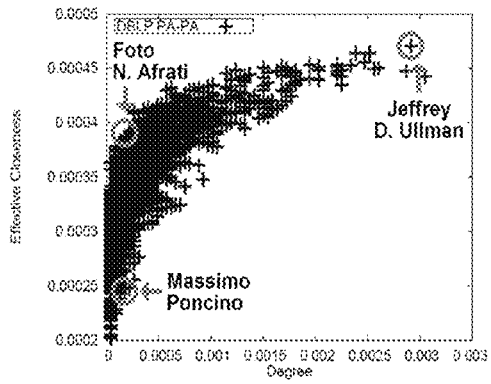
FIG. 9(a) demonstrates an embodiment of the present invention that enables identification, comparison, visualization, and classification according to an embodiment of the present invention, and displays results revealing the utility and application of an embodiment of the present invention.
Figure 9B:
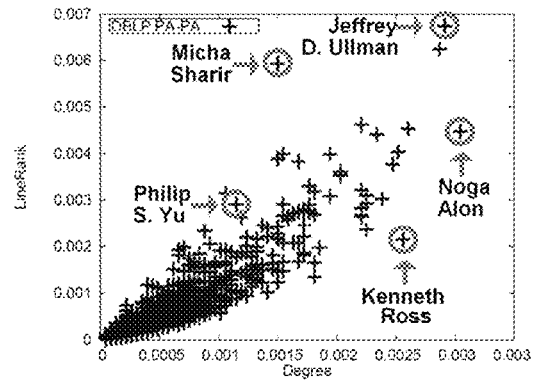
FIG. 9(b) demonstrates an embodiment of the present invention that enables identification, comparison, visualization, and classification according to an embodiment of the present invention, and displays results revealing the utility and application of an embodiment of the present invention.
Figure 9C:
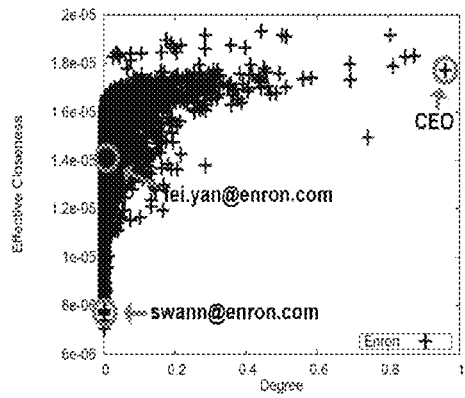
FIG. 9(c) demonstrates an embodiment of the present invention that enables identification, comparison, visualization, and classification according to an embodiment of the present invention, and displays results revealing the utility and application of an embodiment of the present invention.
Figure 9D:
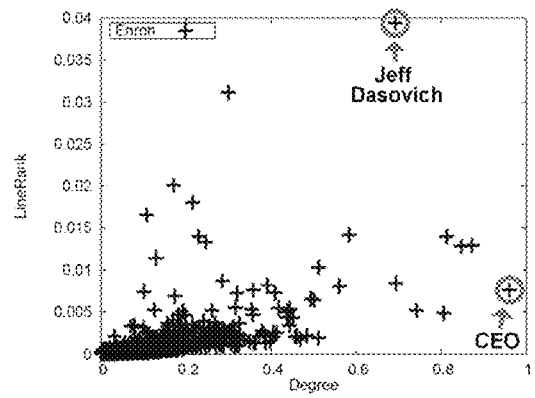
FIG. 9(d) demonstrates an embodiment of the present invention that enables identification, comparison, visualization, and classification according to an embodiment of the present invention, and displays results revealing the utility and application of an embodiment of the present invention.
Figure 9E:
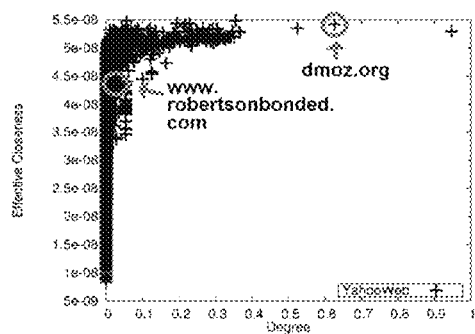
FIG. 9(e) demonstrates an embodiment of the present invention that enables identification, comparison, visualization, and classification according to an embodiment of the present invention, and displays results revealing the utility and application of an embodiment of the present invention.
Figure 9F:
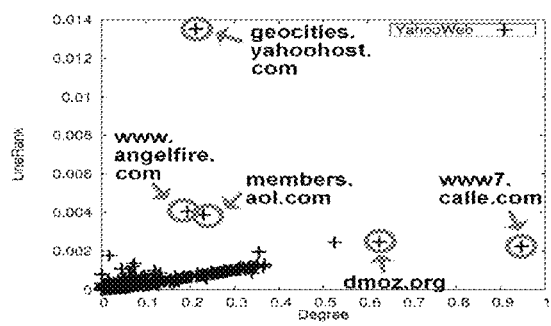
FIG. 9(f) demonstrates an embodiment of the present invention that enables identification, comparison, visualization, and classification according to an embodiment of the present invention, and displays results revealing the utility and application of an embodiment of the present invention.
Figure 10A:
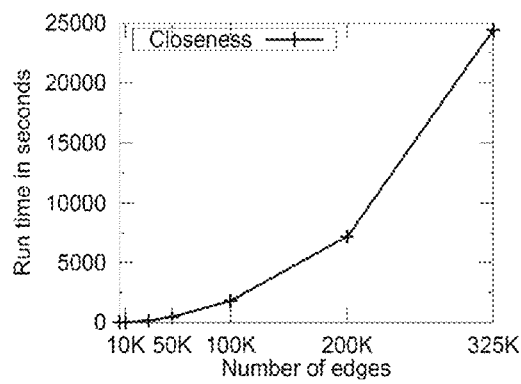
FIG. 10 (a) provides a point of comparison for embodiments of the present invention by providing experimental results for the standard closeness centrality.
Figure 10B:
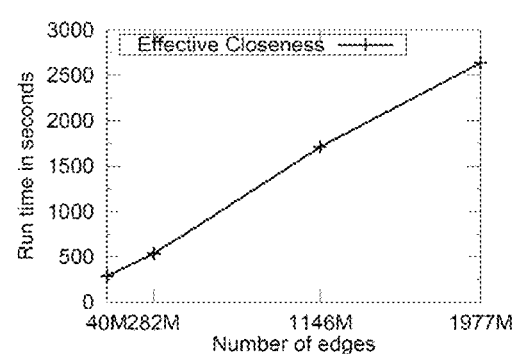
Figure 10C:
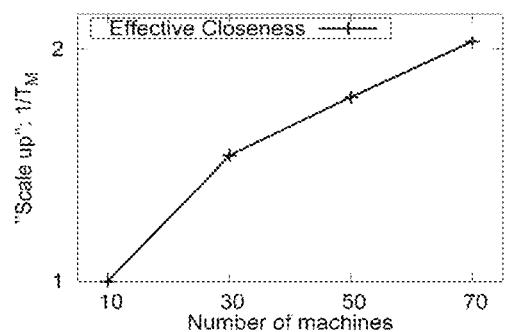
Figure 10D:
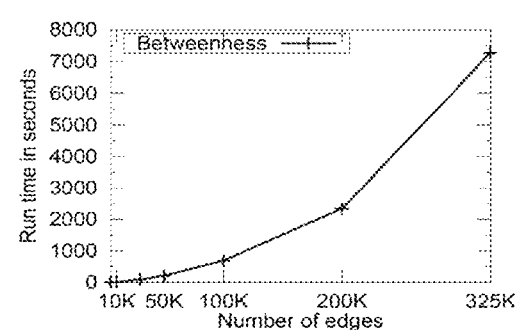
Figure 10E:
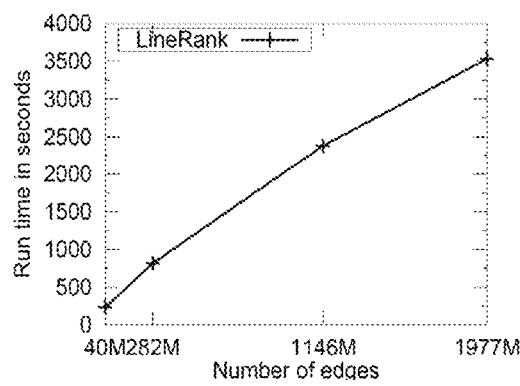
Figure 10F:
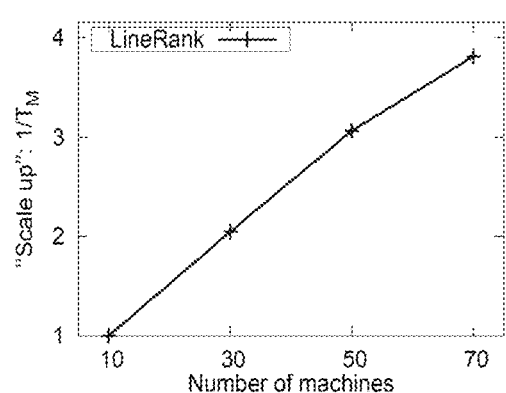

FIGS. 9(a), (b), (c), (d), (e), and (f) demonstrate the results as follows: the scatter plots from all pairs of large scale centrality measures. FIG. 9 (a) is for DBLP Authors: Effective Closeness vs. Degree, FIG. 9 (b) is for DBLP Authors: LINERANK vs. Degree, FIG. 9 (c) is for Enron: Effective Closeness vs. Degree, FIG. 9 (d) is for ENRON: LINERANK vs. Degree, FIG. 9 (e) is for YahooWeb: Effective Closeness vs. Degree, and FIG. 9 (f) is for YahooWeb: LINERANK vs. Degree. The effective closeness and the degree centralities are normalized. It is of note that high degree nodes have high effective closeness since they can reach other nodes within small number of steps due to many neighbors. However, low degree nodes have varying effective closeness. Thus, effective closeness can be used to distinguish nodes with low degrees. High degree nodes can also be distinguished by LINERANK.

Several observations are apparent by examining the above results. First, high degree nodes have high effective closeness, reflecting their higher chances to reach other nodes quickly. In contrast to high degree nodes, low-degree nodes have various values of the effective closeness. This implies that nodes that are hard to differentiate by degree measure can now be easily separated by the effective closeness measure. The reason is that, if a node v has an effective closeness f, then a neighboring node of v will also have an effective closeness similar to f. Thus, two nodes with the same degree can have different effective closeness based on which nodes they are connected to. For example, in the DBLP prolific authors' dataset, both Foto N. Afrati and Massimo Pocino have degree 5. Remember that these degrees might be much smaller than the authors' total number of co-authors since the data contains only edges among prolific authors. Regardless of the same degree, however, Foto N. Afrati has 1.6 times larger effective closeness than Massimo Pocino, since Foto has co-authored a paper with Jeffrey D. Ullman who has the highest effective closeness. Similarly, in the Enron dataset, Kenneth Lay, the CEO of Enron, has a high effective closeness. fei.yan@enron.com has degree 1 but 1.81× higher effective closeness than swann@enron.com with the same degree, since fei.yan@enron.com has exchanged an email with the CEO. Finally, in the YahooWeb dataset, the site www.robertsonbonded.com has degree 1 but has high effective closeness $4:4\times10^{-8}$ which is more than 4 times larger than the effective closeness of some pages with the same degree. The reason is that www.robertsonbonded.com is pointed by dmoz.org which has one of the highest effective closeness. Thus, it can be concluded that the effective closeness gives additional useful information not conveyed by the degree.

Next, Low degree nodes have varying effective closeness based on the closeness of their neighbors. For this reason, effective closeness can be used to distinguish low degree nodes.

Nodes with high degree tend to have high effective closeness, and as a result, effective closeness may result in being unable to distinguish between the two. LINERANK can be used to distinguish high degree nodes. In contrast to the degree which considers only one-step neighbors, LINERANK considers also the quality of the connections of a node's neighbors. Thus, some nodes have high degree but have relatively low LINERANK due to the strength of the edges. For example, Noga Alon has the highest degree in the DBLP prolific authors dataset, but his LINERANK is smaller than Jeffrey D. Ullman since Noga Alon co-authored 125 papers which is smaller than 199 papers that Jeffrey D. Ullman co-authored with the rest of the authors in the dataset. On the other hand, some authors have high LINERANK compared to the degree. For example, Philip S. Yu has only 26 co-authors but published 147 papers, thus he has a higher LINERANK than Kenneth A. Ross who has 58 co-authors but published 66 papers. The same applies to Micha Sharir who has 34 coauthors but 223 papers co-authored, and thus has a higher LINERANK. Again, be aware that the number of co-authors and publication counts can be much smaller than the authors' total co-authors and publications since the data contains only edges among prolific authors. Similarly, in the Enron data, the CEO Kenneth Ray has the highest degree, but his LINERANK is smaller than Jeff Dasovich, the governmental affairs executive, since Jeff exchanged about 10× more emails than the CEO probably due to his role. In the YahooWeb data, the top 3 highest degree hosts (www7.calle.com, dmoz.org, and www.dmoz.org), are different from the top 3 highest LINERANK hosts (geocities.yahoohost.com, www.angelfire.com, and members.aol.com). Again, the reason for this difference is the strength of the connections: the top 3 highest LINERANK hosts have more total neighboring pages than the top 3 highest degree hosts. Hence, it can be concluded that LINERANK gives yet additional useful information for distinguishing high degree nodes.

Furthermore, High degree nodes have varying LINERANK based on the strength of the incident edges. Thus, as stated, LINERANK can be used to distinguish high degree nodes.

In addition to the above results, additional results are presented to demonstrate the utility of the present invention. Scalability experiments are performed on synthetic datasets, since this allows flexibility in choosing graphs of any size.

FIGS. 10(*a*), (*b*), (*c*), (*d*), (*e*), and (*f*) show the results from experiments on efficiency and scalability. FIGS. 10 (*a*) and (*d*) show the running time for "standard" centrality measures, (where FIG. 10 (*a*) is for standard closeness and FIG. 10 (*b*) is for shortest-path betweenness), on a single machine. The running time clearly grows super linearly with respect to the number of edges.

FIGS. 10 (*b*), (*c*), (*e*), and (*f*) show the running times of the distributed algorithms employing the proposed centralities according to the present invention. For each of the two algorithms, Algorithm 1 and Algorithm 2, employing the centrality measures according to the present invention (effective closeness and LINERANK), both the number of machines, as well as the size of the graphs are varied. Both algorithms, the one that employs effective closeness and the one that employs LINERANK, show linear scale-up with respect to the number of edges, in FIGS. 10 (*b*) and (*e*). For this set of experiments, the number of machines was fixed at 50. Scale-up is also near-linear with respect to the number of machines. FIGS. 10 (*c*) and (*f*) show the scale-up $T_1/T_M$ where $T_M$ is the running time with M machines. The scale-up score is normalized so that it is 1 when M=10. Both of the algorithms scale near-linearly with respect to number of machines. For this set of experiments, the size of the graph was fixed to 282M edges.

Further, the Figures described in the preceding two paragraphs reveal the following: for FIGS. 10 (*a*) and (*d*), the scalability of the standard closeness and betweenness implementation, it is noticeable that they grow super-linear on the number of edges, and that they take a long time for a relatively small graph with 325 K nodes. For FIGS. 10 (*b*) and (*c*), the scalability of the effective closeness algorithm implementation, it is noticeable that there is a near-linear scale-up on the number of machine. The running time is for one iteration on the Kronecker datasets. The experiment for FIG. 10 (*c*) is performed on the 282 million edges graph. For FIGS. 10 (*e*) and (*f*), the scalability of LINERANK algorithm implementation, the running time is for one power iteration on the line graphs of the Kronecker graphs. The experiment for FIG. 10 (*f*) is performed on the 282 million edges graph. As in the effective closeness, it is noticeable that there is a linear scale-up on the number of edges and the number of machines.

Additionally, FIGS. 11 (*a*), (*b*), and (*c*) show the correlation between effective closeness and the standard closeness on small, real-world graphs (for the identified datasets as labeled in FIGS. 11(*a*), (*b*), and (*c*)), where FIG. 11 (*a*) shows a DBLP Corr. Coefficient 0.994, FIG. 11 (*b*) shows a ENRON Corr. Coefficient 0.992, and FIG. 11 (*c*) shows a AS-Oregon Corr. Coefficient 0.978. It is noticeable that they are near-linearly correlated with correlation coefficients at least 0.978. Also, the scatter plot of standard closeness versus effective closeness is provided on relatively small graphs where it is feasible to compute the former measure. Each point in the scatter plot corresponds to a node in the graph. Across all datasets there exist clear linear correlations between the two measures with correlation coefficients of at least 0.978. Therefore, effective closeness is a good substitute for standard closeness. Moreover, as already stated, an effective closeness implementation can also be used in billion-scale graphs, while standard closeness is limited to small graphs.

As should be apparent, and as previously stated, all of the methods and embodiments of the present invention, including the method and embodiments that employ effective closeness or LINERANK measures can be performed for one node, multiple nodes, or all nodes in a node graph.

Figure 12:
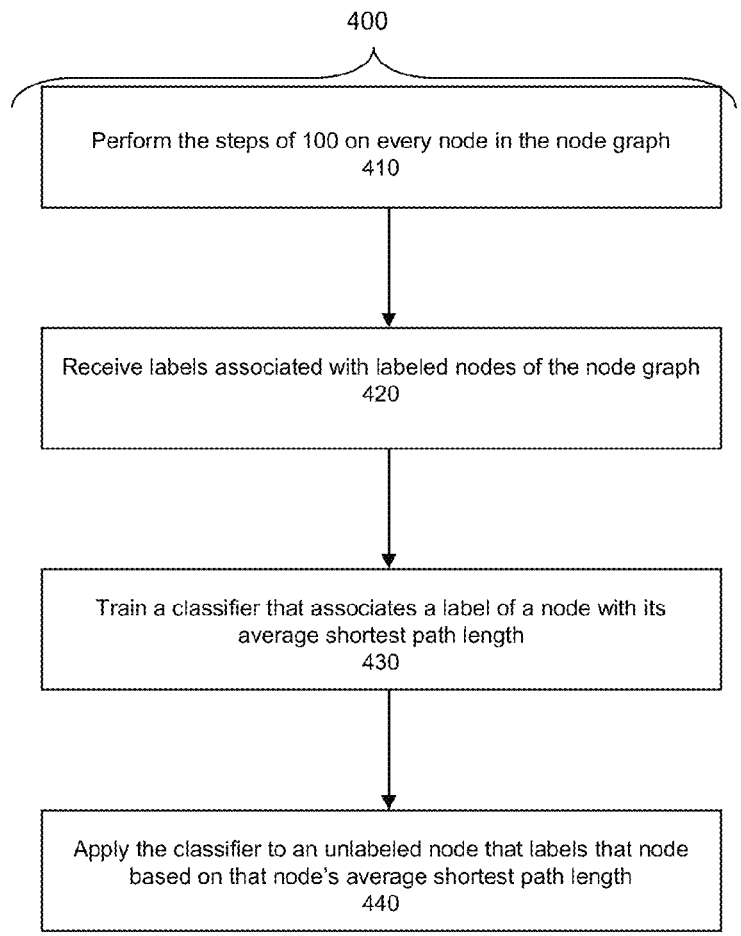
FIG. 12 is a block diagram that illustrates a computer implemented method for determining the importance of a data item according to an embodiment of the present invention that labels nodes associated with the data items using the determined importance according to an embodiment of the present invention.
Figure 15:
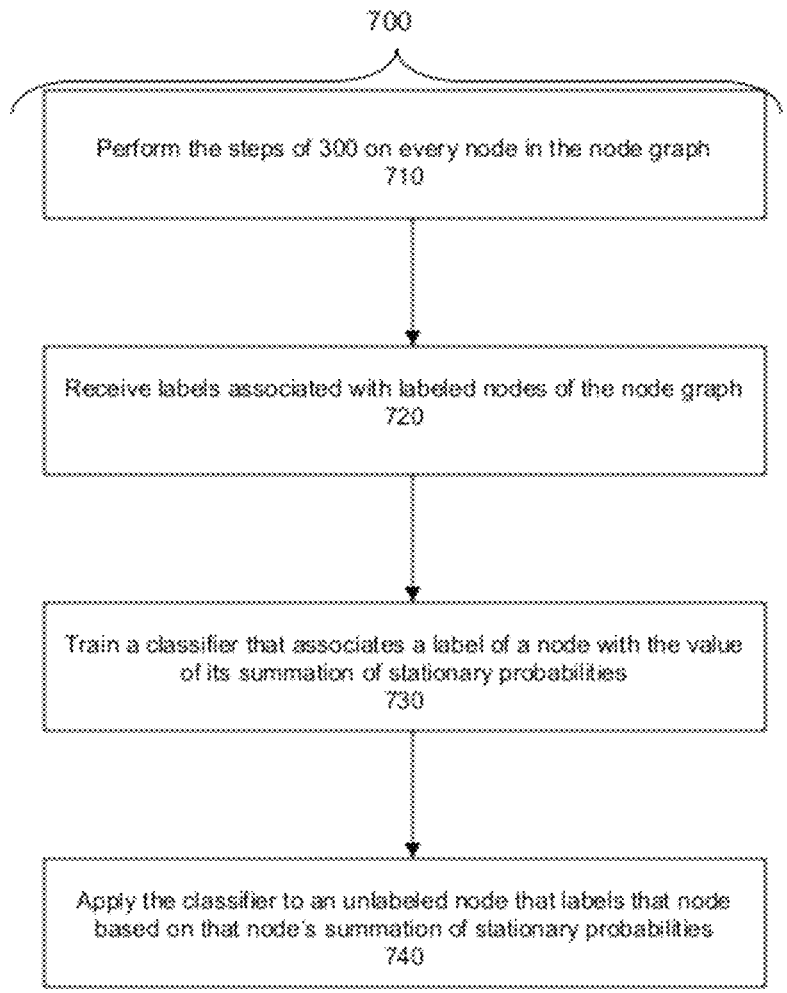
FIG. 15 is a block diagram that illustrates a computer implemented method for determining the importance of a data item according to an embodiment of the present invention that labels nodes associated with the data items using the determined importance according to an embodiment of the present invention.

According to FIGS. 12 and 15, and given the above description of the present invention, another embodiment of the present invention is the application of classification and labeling 400 and 700. This embodiment involves nodes that have labels based on the relationship between the data items they represent in the network, and the relationship is represented by the edges (and applicable weights ascribed to those edges based on the relationship) between the nodes in the node graph. The method is achieved by: 1) receiving the labels of some nodes, where some nodes in the graph can be labeled or unlabeled (with any variation thereof) 420 and 720, 2) training a classifier over the labeled node or nodes using a centrality measure, such as effective closeness, a measure or score derived from an effective closeness type measure 430, LINERANK or a measure or score derived from a LINERANK type measure 730, and 3) applying the classifier to an un-labeled node or nodes, using the unlabeled node or nodes own centrality measure, such as effective closeness 440, a measure or score derived from an effective closeness type measure, LINERANK or a measure or score derived from a LINERANK type 740 to predict that unlabeled node's or nodes' class label 440 and 740. The scores of the nodes based on the measures correlate to the labels or lack of labels, and as such an applicable label or lack of a label can be determined for the unlabeled nodes. This embodiment can cover one node, multiple nodes, or all nodes in the node graph and can calculate other features of the nodes, both labeled and unlabeled, to train the classifier, or apply the classifier, or both.

In fact, a preferred manner of implementing the above application is to implement the method according to FIG. 3 410 or the method according to FIG. 5 710 prior to implementing the rest of the steps for acquiring labeling or classification.

Figure 13:
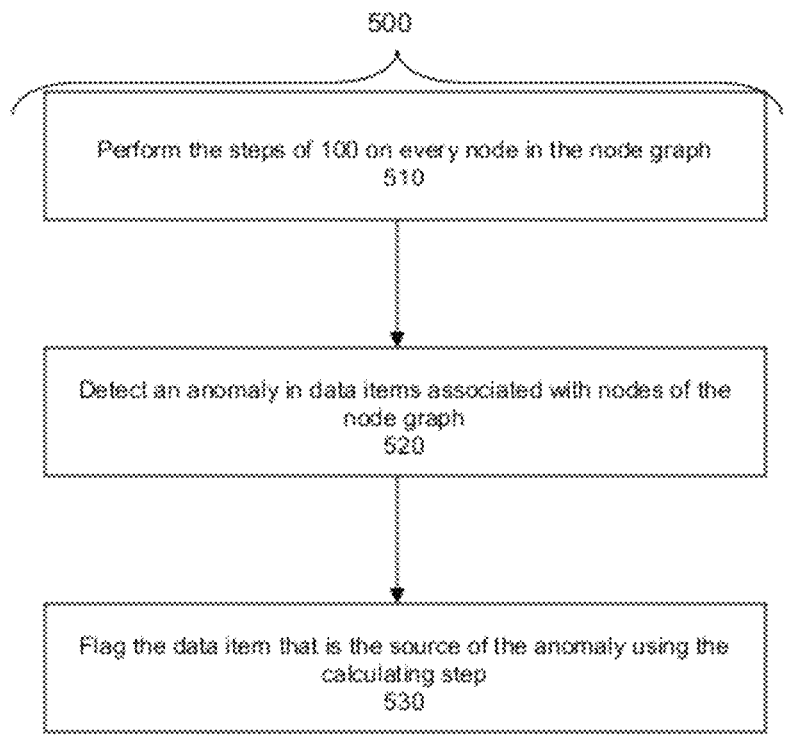
FIG. 13 is a block diagram that illustrates a computer implemented method for determining the importance of a data item according to an embodiment of the present invention that detects anomalies in the data items using the determined importance according to an embodiment of the present invention.
Figure 16:
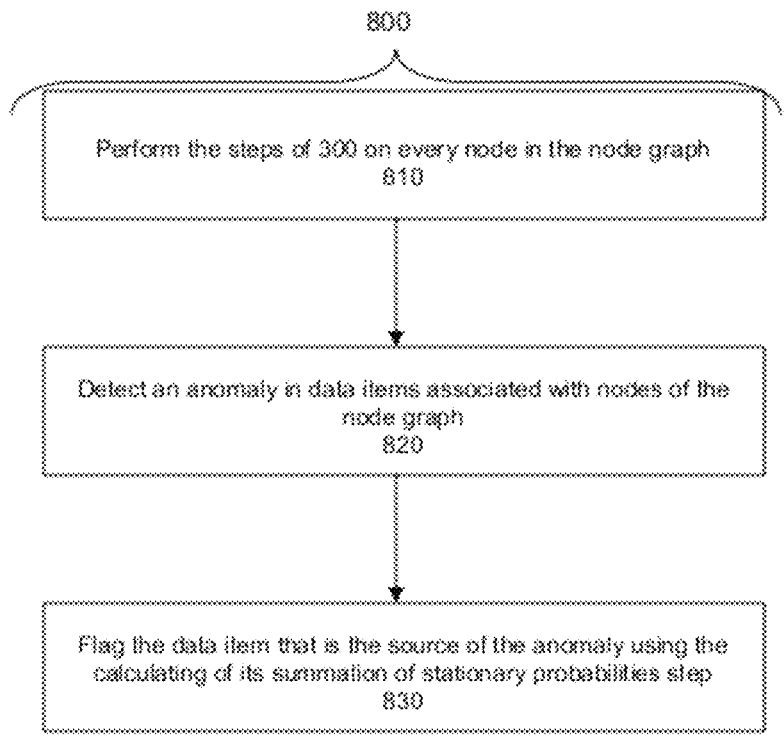
FIG. 16 is a block diagram that illustrates a computer implemented method for determining the importance of a data item according to an embodiment of the present invention that detects anomalies in the data items using the determined importance according to an embodiment of the present invention.

According to FIGS. 13 and 16, and given the above description of the present invention, another embodiment of the present invention is the application of anomaly detection 500 and 800. The method involves 1) detecting an anomaly in a data item or data items using standard detection techniques such as, but not limited to, those found in anti-viral software packages 520 and 820, and then 2) using the centrality measures on the node or nodes associated with the anomalous data item or date items, such as effective closeness, a measure or score derived from an effective closeness type measure 530, LINERANK or a measure or score derived from a LINERANK type measure 830, for flagging the sources of the anomaly. The node or nodes with the highest score based on those measures represent the data item that is the source of the anomaly. This embodiment can cover one node, multiple nodes, or all nodes in the node graph, and can calculate other features of the data items and nodes, both anomalous and normal.

In fact, a preferred manner of implementing the above application is to implement the method according to FIG. 3 510 or the method according to FIG. 5 810 prior to implementing the rest of the steps for determining anomaly detection.

Figure 14:
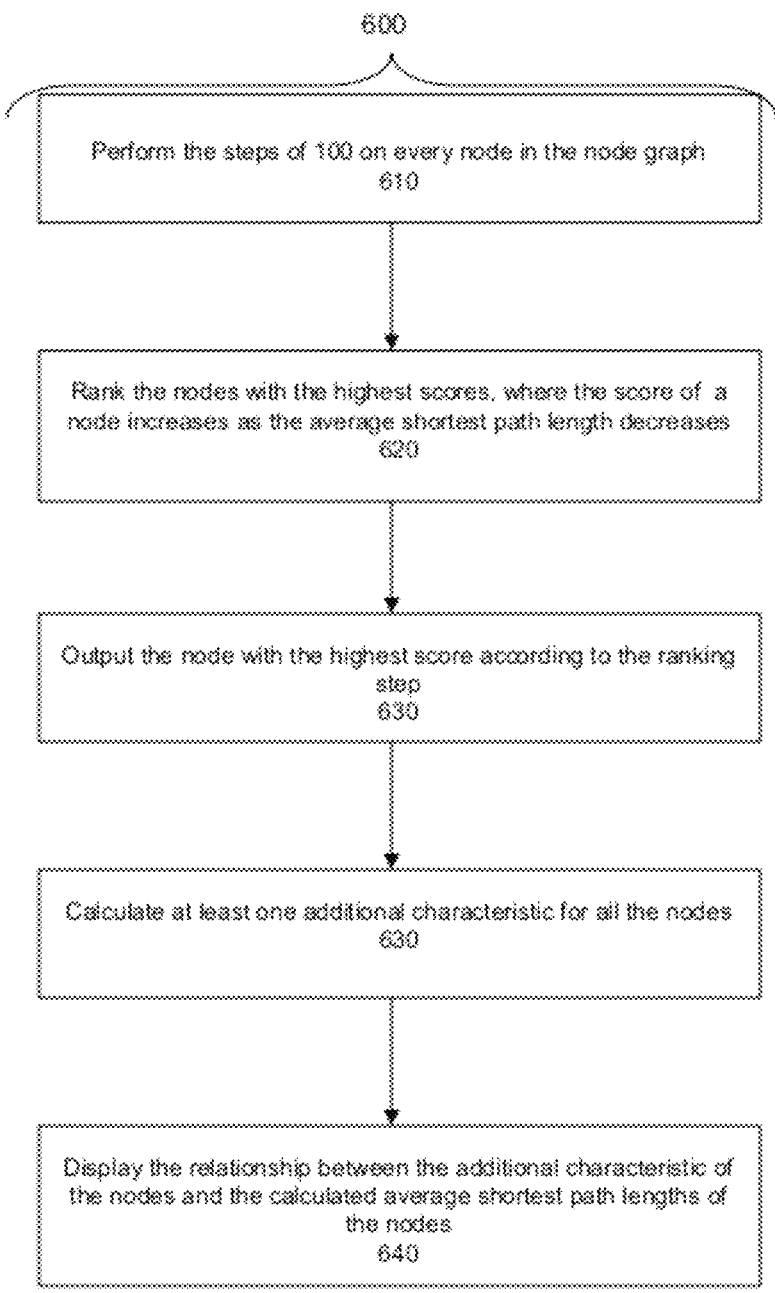
FIG. 14 is a block diagram that illustrates a computer implemented method for determining the importance of a data item according to an embodiment of the present invention that ranks and displays nodes associated with the data items using the determined importance according to an embodiment of the present invention.
Figure 17:
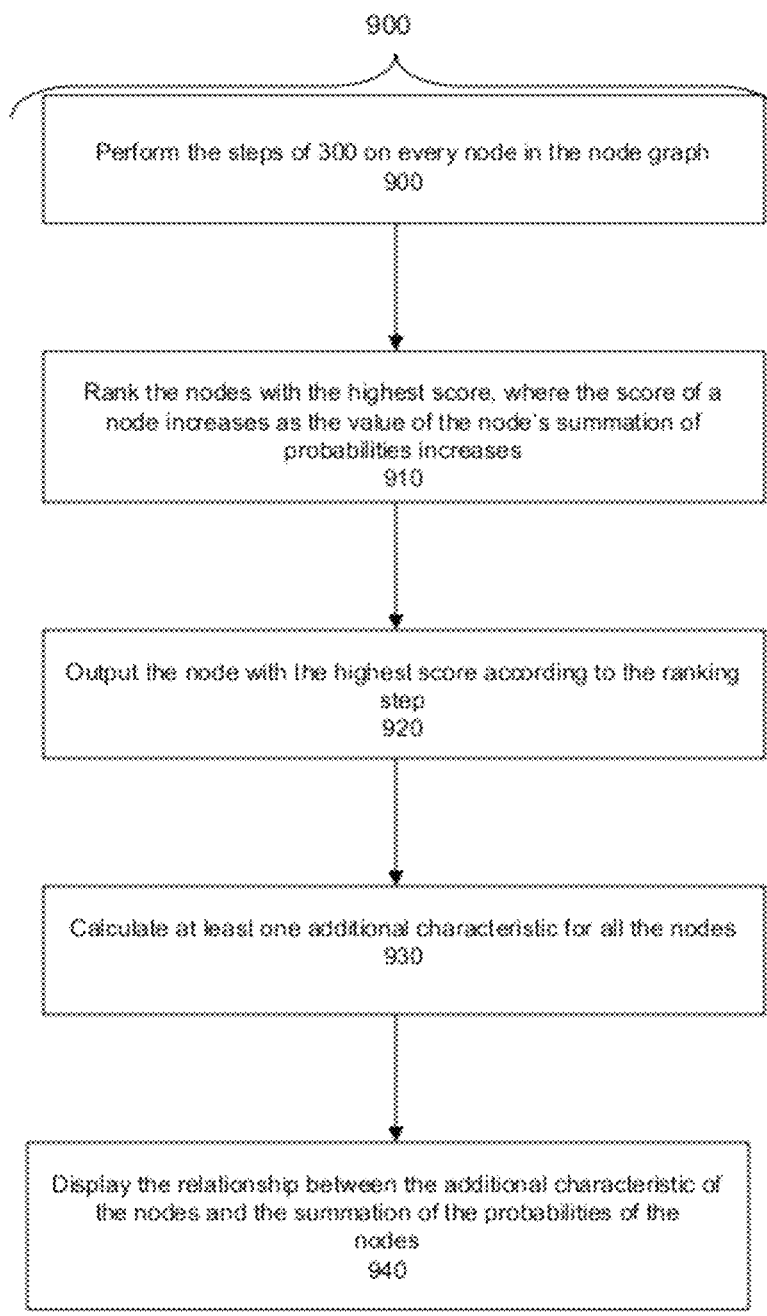
FIG. 17 is a block diagram that illustrates a computer implemented method for determining the importance of a data item according to an embodiment of the present invention that ranks and displays nodes associated with the data items using the determined importance according to an embodiment of the present invention.

According to FIGS. 14 and 17, and given the above description of the present invention, an additional embodiment of the present invention is the application of ranking according to scores based on centrality measures 600 and 900. The centrality measures can include effective closeness, a measure or score derived from an effective closeness type measure 620, LINERANK or a measure or score derived from a LINERANK type measure 920. Further, this embodiment involves: 1) sorting the nodes according to the centrality scores, such as scores based on effective closeness, a score derived from an effective closeness type measure 620, LINERANK or a measure or score derived from a LINERANK type measure 920, and then 2) outputting the node or nodes with the highest centrality scores 630 and 930.

Additionally, and again according to FIGS. 14 and 17, another aspect of the present invention involves the application of visualization: 3) calculating an additional characteristic associated with the nodes of the node graph 630 and 930, such as degree, 4) outputting or displaying a scatter-plot of the centrality measure, such as effective closeness, a measure or score derived from an effective closeness type measure, and LINERANK or a measure or score derived from a LINERANK type measure vs. the additional characteristic 640 and 940 (this can be done as each node becomes a point in 2-d space, where the x-axis is the additional characteristic of the node, such as degree, and the y-axis is the effective closeness of the node). Those skilled in the art will appreciate that this can be done for a node, multiple nodes, or all the nodes 610 and 910 of the node graph. Further, degree is merely an exemplary feature, and some other feature can be compared and outputted in the above scheme in its stead. Additionally, there are various types of graphs, displays, and the like known in the art for the visualization scheme, and the 2-d scatter plot and display is merely exemplary.

A preferred manner of implementing the above application is to implement the method according to FIG. 3 610 or the method according to FIG. 5 910 prior to implementing the rest of the steps for acquiring ranking and visualization.

Figure 18:
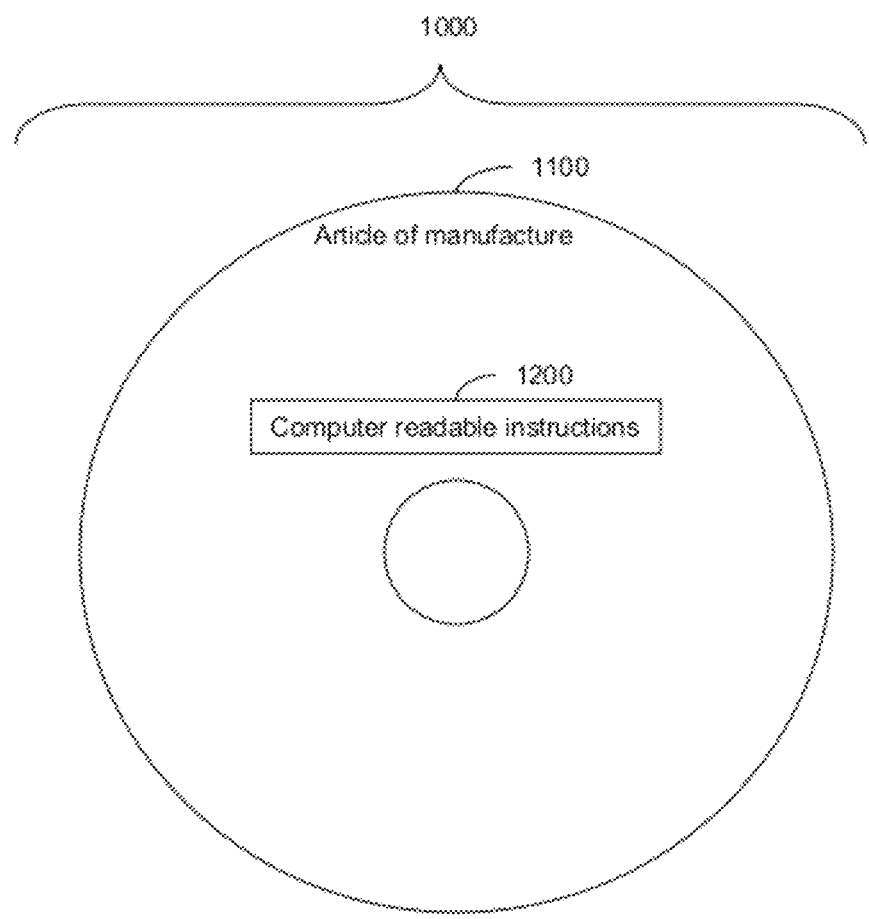
FIG. 18 is an illustration of an article of manufacture for carrying out the steps of the methods according to embodiments of the present invention.

According to a further embodiment of the present invention, an article of manufacture is provided that includes a computer readable medium having computer readable instructions embodied therein for performing the steps of the computer-implemented methods, including but not limited to 100 and 200, as displayed in FIGS. 3 and 5, described above. FIG. 18 illustrates the article of manufacture 1000 that includes a computer readable medium having computer readable instructions 1200 for carrying out the steps of the methods described above, including 100 and 200 discussed above with reference to FIGS. 3 and 5.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 19:
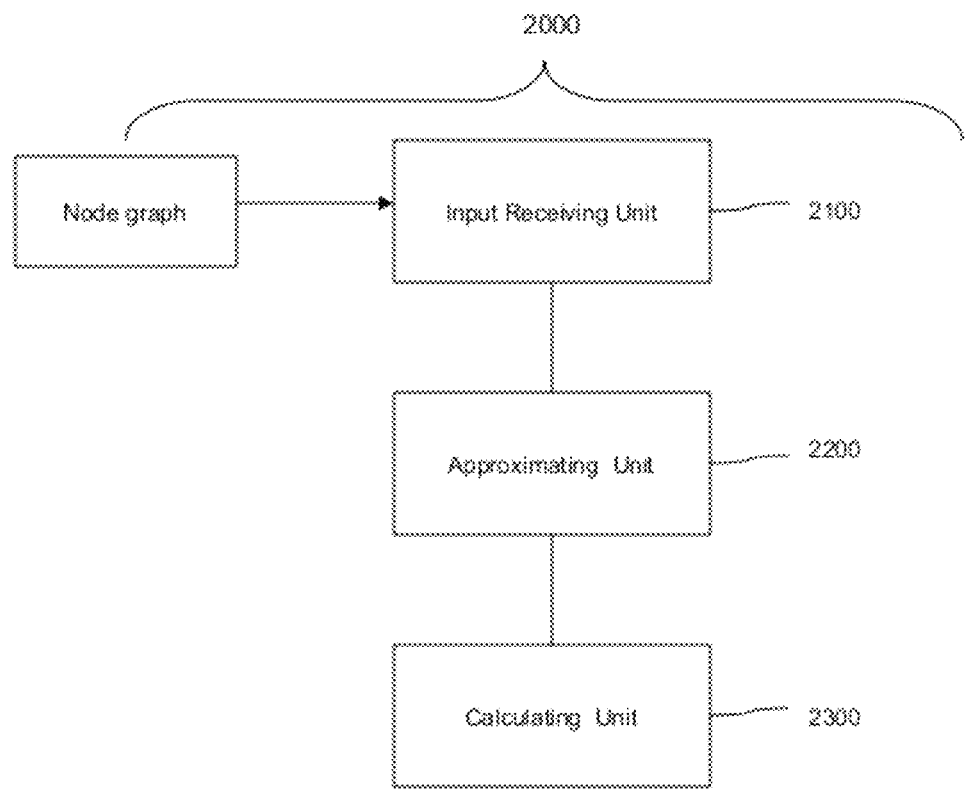
FIG. 19 is a block diagram that illustrates a computer implemented data assessment system for determining the importance of a data item according to an embodiment of the present invention.

According to FIG. 19, another embodiment of the present invention is provided, a computer data assessment system for determining the importance of a data item 2000. The system includes: an input receiving unit 2100, an approximating unit 2200, and a calculating unit 2300.

The input receiving unit 2100 is configured to receive a node graph representation of data items in a network.

The approximating unit 2200 is configured to approximate the number of neighbor nodes associated with a node representing a data item in the node graph.

The calculating unit 2300 is configured to compute the average shortest path length from the node to the remaining nodes in the node graph using the approximation provided by the approximating unit. This calculation determines the importance of the data item associated with that node.

Figure 20:
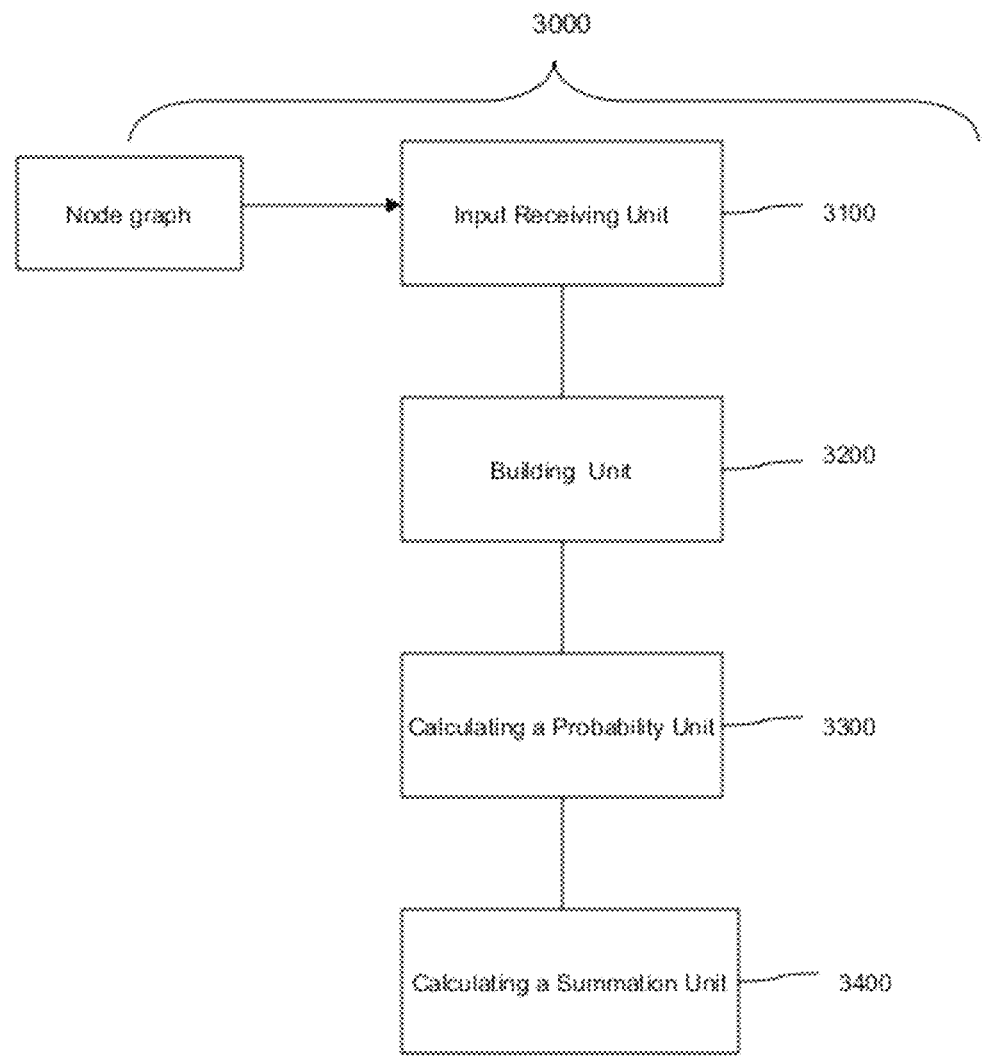
FIG. 20 is a block diagram that illustrates a computer implemented data assessment system for determining the importance of a data item according to an embodiment of the present invention.

According to FIG. 20, another embodiment of the present invention is provided, a computer data assessment system for determining the importance of a data item 3000. The system includes: an input receiving unit 3100, a building unit 3200, a calculating a stationary probability unit 3300, and a calculating a summation unit 3400.

The input receiving unit 3100 is configured to receive a node graph representation of data items in a network.

The building unit 3200 is configured to build an approximation of a line graph of the node graph by decomposing the line graph into sparse matrixes.

The calculating a stationary probability unit 3300 is configured to compute the stationary probabilities of edges in the decomposed line graph using the sparse matrices, where the edges are incident edges associated with at least one node of the node graph.

The calculating a summation unit is configured to compute a summation of the stationary probabilities of the incident edges associated with node, where this calculation demonstrates the importance of the data item associated with the node.

Figure 21:
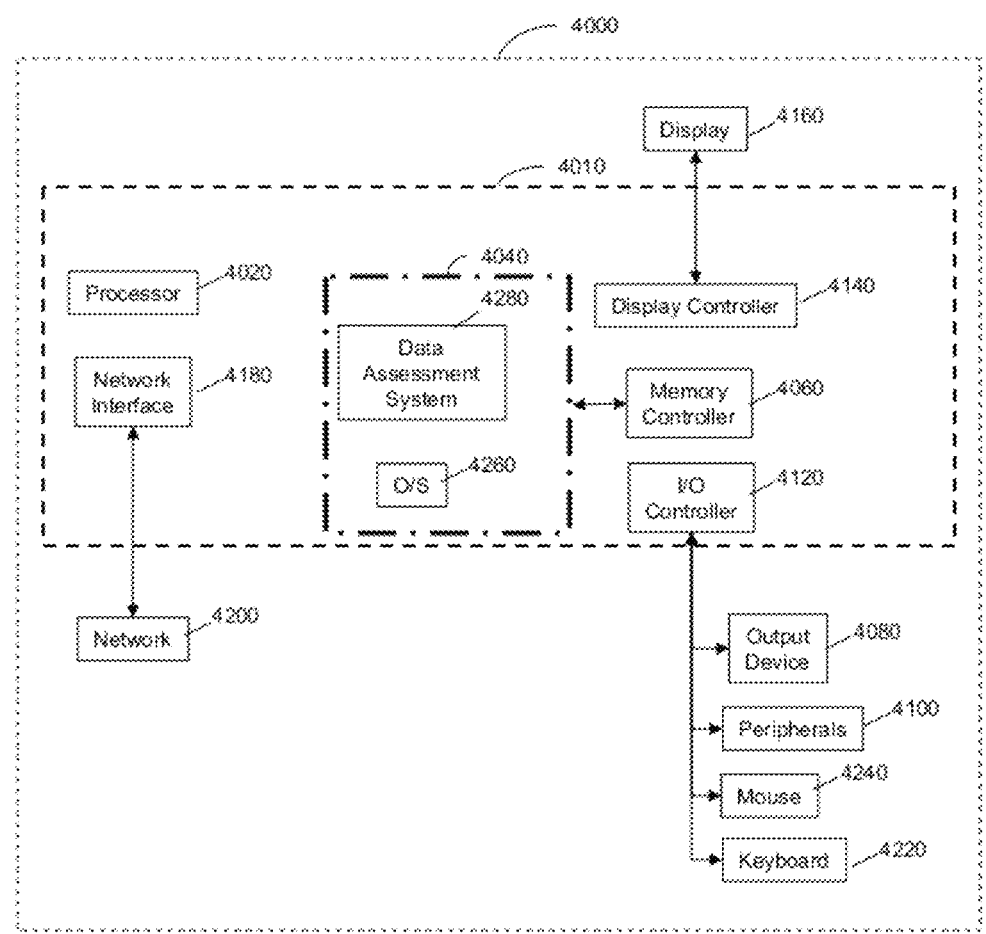
FIG. 21 is a block diagram that illustrates a computer-implemented system that includes a data assessment system for determining the importance of a data item according to an embodiment of the present invention.

FIG. 21 displays an exemplary computing system capable of employing the data assessment systems 2000 and 3000 in FIGS. 19 and 20. This system is merely exemplary and those skilled in the art can employ alternative systems consistent with the present invention. As can be appreciated, the computing system 4000 may include a computing device, including but not limited to, a desktop computer, a laptop, a server, a portable handheld device, or any other electronic device. For ease of the discussion, an embodiment of the invention will be discussed in the context of the computer 4010.

The computer 4010 is shown to include a processor 4020, memory 4040 coupled to a memory controller 4060, one or more input and/or output (I/O) devices, peripherals 4080, 4100 that are communicatively coupled via a local input/output controller 4120, and a display controller 4180 coupled to a display 4160. In an exemplary embodiment, the system 4000 can further include a network interface 4140 for coupling to a network 4200. The network 4200 transmits and receives data between the computer 4010 and external systems. In an exemplary embodiment, a conventional keyboard 4220 and mouse 4240 can be coupled to the input/output controller 4200.

In various embodiments of the present invention, the memory 4040 stores instructions that can be executed by the processor 4020. The instructions stored in memory 4040 may include one or more separate programs, each of which comprises an ordered listing of executable instructions for implementing logical functions. In the example of FIG. 21, the instructions stored in the memory 4040 include at least a suitable operating system (OS) 4260 and data assessment system 4280. This system can be either the system 2000 or 3000 as displayed in FIGS. 19 and 20. The operating system 4260 essentially controls the execution of other computer programs and provides scheduling, input-output control, file and data management, memory management, and communication control and related services.

When the computer 4010 is in operation, the processor 4020 is configured to execute the instructions stored within the memory 4040, to communicate data to and from the memory 4040, and to generally control operations of the computer 4010 pursuant to the instructions. The processor 4020 can be any custom made or commercially available processor, a central processing unit (CPU), an auxiliary processor among several processors associated with the computer 4010, a semiconductor based microprocessor (in the form of a microchip or chip set), a macroprocessor, or generally any device for executing instructions.

The processor 4020 executes the instructions of the data assessment system 4280 according to embodiments of the present invention. In various embodiments, the data processing system 4280 of the present invention is stored in the memory 4040 (as shown), is executed from a portable storage device (e.g., CD-ROM, Diskette, FlashDrive, etc.) (not shown), and/or is run from a remote location such as from a central server (not shown). The data processing system 4280 may be a software application that carries out a process such as described above with reference to FIG. 3 or 5. In some embodiments of the present invention, memory 4040 also stores data, such as received data items from a network, node graph data, and that data produced or executed by the methods of the present invention, including FIG. 3 or 5.

What is claimed is:

1. A computer implemented method for determining the importance of a data item in an electronic network, said method comprising the steps of:
   receiving a node graph,
      wherein said node graph is a representation of at least two data items with at least one relationship between said at least two data items,
      wherein said at least two data items are represented by nodes on said node graph, and
      wherein said at least one relationship is represented by at least one edge between said nodes;
   approximating a number of neighbor nodes of at least one node of said node graph; and
   calculating an average shortest path length from said at least one node to remaining nodes contained in said node graph using said approximated number of neighbor nodes, wherein said calculated average shortest path demonstrates the importance of a data item represented by said at least one node,
   wherein at least one step is carried out using a computer device.

2. The method according to claim 1 wherein said approximation step is performed by an estimation algorithm that iteratively updates a sum representing a total number of neighbor nodes, and wherein said iteration begins with a minimum defined unit and ends when said iteration reaches a value equivalent to a diameter of said node graph.

3. The method according to claim 2 wherein said estimation algorithm is a Flajolet-Martin algorithm.

4. The method according to claim 3 wherein bit-strings of said Flajolet-Martin algorithm are iteratively updated by a bitwise-or operation.

5. The method according to claim 4 wherein the steps of the method are performed for multiple nodes in said node graph, wherein said multiple nodes are connected by edges representing said at least one relationship.

6. The method according to claim 5, wherein said multiple nodes comprise labeled nodes and unlabeled nodes, and wherein the method comprises the additional steps of:
   receiving labels associated with said labeled nodes of said node graph, wherein said labels are based on said at least one relationship;
   training a classifier that associates a label of a labeled node with a average shortest path length of said labeled node; and
   applying said classifier to a unlabeled node, wherein said classifier labels said unlabeled node based on said association by using a average shortest path length of said unlabeled node.

7. The method according to claim 5, wherein said multiple nodes represent multiple data items containing an anomaly, and wherein the method comprises the additional steps of:
   detecting an anomaly contained in said multiple data items containing an anomaly; and
   flagging a source of said anomaly in said multiple data items containing an anomaly by using said calculating step, wherein a anomalous data item with a corresponding node in said node graph with a smallest average shortest path length operates as said source of said anomaly.

8. The method according to claim 5 comprising the additional steps of:
   ranking each node of said multiple nodes by a score determined by using said calculating step, wherein said score of a ranked node increases as the average shortest path length of said ranked node decreases;
   outputting a ranked node with a highest score;
   calculating at least one additional characteristic associated with each ranked node; and
   displaying a relationship between said additional characteristic for said each ranked node and said score for said each ranked node.

9. The method according to claim 5 wherein said multiple nodes represent data items that are email data items of individuals in an organization, and wherein said at least one relationship represents email exchanges between said email data items, and the method comprises the additional step of:
   identifying importance of an individual within said organization using said calculating step, wherein said importance increases as said average shortest path length of a node representing an email data item of said individual decreases.

10. A computer implemented method for determining the importance of a data item in an electronic network, said method comprising the steps of:
   receiving a directed node graph,
      wherein said directed node graph is a representation of at least two data items with at least one relationship between said at least two data items,
      wherein said at least two data items are represented by nodes on said directed node graph, and
      wherein said at least one relationship is represented by at least one edge between said nodes;
   building an approximation of a directed line graph of said directed node graph by decomposing said directed line graph into sparse matrixes;
   calculating stationary probabilities of edges in said decomposed directed line graph using said sparse matrixes, wherein said edges are incident edges associated with at least one node of said directed node graph; and
   calculating a summation of said stationary probabilities of said incident edges associated with said at least one node of said directed node graph, wherein said summation demonstrates the importance of a data item represented by said at least one node,
   wherein at least one step is carried out using a computer device.

11. The method according to claim 10 wherein said at least one edge carries a weighted value, and wherein said directed line graph is a weighted line graph.

12. The method according to claim 11 wherein said calculating stationary probabilities steps uses a Page Rank algorithm on said decomposed weighted line graph.

13. The method according to claim 12 comprising the additional step of: building a normalization factor prior to performing said calculating steps, wherein said normalization factor is used to make said sparse matrices suitable for power iteration, and wherein said Page Rank algorithm is performed by power iteration.

14. The method according to claim 13 wherein the steps of the method are performed for multiple nodes of said directed node graph, and wherein said multiple nodes are connected by edges representing said at least one relationship.

15. The method according to claim 14, wherein said multiple nodes comprise labeled nodes and unlabeled nodes, and wherein the method comprises the additional steps of:
   receiving labels associated with said labeled nodes of said directed node graph, wherein said labels are based on said at least one relationship;
   training a classifier that associates a label of a labeled node with a summation of said stationary probabilities of said labeled node; and
   applying said classifier to a unlabeled node, wherein said classifier labels a unlabeled node based on said association by using a summation of said stationary probabilities of said unlabeled node.

16. The method according to claim 14, wherein said multiple nodes represent multiple data items containing an anomaly, and wherein the method comprises the additional steps of:
   detecting an anomaly contained in said multiple data items containing an anomaly; and
   flagging a source of said anomaly in said multiple data items containing an anomaly by using said calculating a summation step, wherein a anomalous data item with a corresponding node in said directed node graph with a highest value of said summation of stationary probabilities operates as said source of said abnormality.

17. The method according to claim 14 comprising the additional steps of:
   ranking each node of said multiple nodes by a score determined by using said calculating a summation step, wherein said score of a ranked node increases as the summation of stationary probabilities value increases for said ranked node;
   outputting a ranked node with a highest score;
   calculating at least one additional characteristic associated with each ranked node of said directed node graph; and
   displaying a relationship between said additional characteristic for said each ranked node and said score for said each ranked node.

18. A computer implemented data assessment system for determining the importance of a data item, said system comprising:
   at least one memory element storing the system;
   at least one processor coupled to the memory element;
   wherein the processor executes the following units of the system:
   an input receiving unit configured to receive a node graph,
      wherein said node graph is a representation of at least two data items with at least one relationship between said at least two data items,
      wherein said at least two data items are represented by nodes on said node graph,
      wherein said at least one relationship is represented by at least one edge between said nodes;
   an approximating unit configured to approximate a number of neighbor nodes of at least one node of said node graph; and
   a calculating unit configured to calculate an average shortest path length from said at least one node to remaining nodes contained in said node graph using said approximated number of neighbor nodes, wherein said calculated average shortest path demonstrates the importance of a data item represented by said at least one node.

19. A computer implemented data assessment system for determining the importance of a data item, said system comprising:
   at least one memory element storing the system;
   at least one processor coupled to the memory element;
   wherein the processor executes the following units of the system:
   an input receiving unit configured to receive a directed node graph,
      wherein said directed node graph is a representation of at least two data items with at least one relationship between said at least two data items,
      wherein said at least two data items are represented by nodes on said directed node graph,
      wherein said at least one relationship is represented by at least one edge between said nodes;
   a building unit configured to build an approximation of a directed line graph of said directed node graph by decomposing said directed line graph into sparse matrixes;
   a calculating a stationary probability unit configured to compute stationary probabilities of edges in said decomposed directed line graph using said sparse matrices, wherein said edges are incident edges associated with at least one node of said directed node graph; and
   a calculating a summation unit configured to compute a summation of said stationary probabilities of said incident edges associated with said at least one node of said directed node graph, wherein said summation demonstrates the importance of a data item represented by said at least one node.

20. A non-transitory article of manufacture comprising a computer readable storage medium having computer readable instructions embodied therein that, when executed by a computer, implements the method according to claim 1.

21. A non-transitory article of manufacture comprising a computer readable storage medium having computer readable instructions embodied therein that, when executed by a computer, implements the method according to claim 10.

\* \* \* \* \*